United States Patent [19]

Parvahan

[11] Patent Number: 5,908,455
[45] Date of Patent: Jun. 1, 1999

[54] HIGH PERFORMANCE AUTOMOTIVE DIAGNOSTICS INSTRUMENTATION ARCHITECTURE

[75] Inventor: Behzad Parvahan, Santa Cruz, Calif.

[73] Assignee: Hewlett-Packard Company, Palo Alto, Calif.

[21] Appl. No.: 08/726,972

[22] Filed: Oct. 7, 1996

[51] Int. Cl.[6] .............................. G06F 7/00; G06F 19/00
[52] U.S. Cl. ......................... 701/29; 701/31; 395/800.01
[58] Field of Search ................................ 701/29, 30, 31, 701/32, 33; 395/800.01, 183.01, 184.01; 364/140.09

[56] References Cited

U.S. PATENT DOCUMENTS

| | | | |
|---|---|---|---|
| 4,853,850 | 8/1989 | Krass, Jr. et al. | 701/35 |
| 5,388,045 | 2/1995 | Kamiya et al. | 701/35 |
| 5,646,865 | 7/1997 | Alfaro et al. | 701/29 |
| 5,671,141 | 9/1997 | Smith et al. | 701/29 |
| 5,736,948 | 4/1998 | Mitsuishi et al. | 341/141 |

Primary Examiner—William A. Cuchlinski, Jr.
Assistant Examiner—Gertrude Arthur
Attorney, Agent, or Firm—Denise A. Lee

[57] ABSTRACT

The present invention provides an automotive test diagnostic system which is capable of achieving high data rates through multiple, independent instrumentation channels. The test diagnostic system includes a vehicle diagnostic instrumentation controller, the vehicle diagnostic instrumentation controller comprising: an instrument peripheral interface means; an instrumentation control means, the instrumentation control means being further comprised of an arbitration control means, and a device interface means, wherein the arbitration control means is electrically coupled to the device interface means; and a first bus for electrically coupling the instrument peripheral interface means to the instrumentation control means. In the preferred embodiment, the instrumentation control means further includes a data qualification means and a data storage means for storing data. However, dependent on the rate of data transfer, the calculations required, etc., a data storage means may not be required for a particular channel.

20 Claims, 24 Drawing Sheets

HIGH PERFORMANCE AUTOMOTIVE DIAGNOSTICS INSTRUMENTATION ARCHITECTURE

BACKGROUND OF THE INVENTION

Automotive onboard electronics systems are becoming increasingly complex. Today's automobiles frequently have multiple microcontrollers to control functions as diverse as engine timing, transmission shift points, vehicle emission, and the control of the vehicle driver interface. Diagnosis of vehicle malfunction often requires similarly complex automobile diagnostic test systems and tools. For example, for a cylinder using a coil-on-plug (distributor-less) design, diagnosis of cylinder mis-firing requires the use of a high-speed oscilloscope.

Current automobile diagnostic test systems must (1) communicate with and retrieve fault information from the vehicle's on-board microcontrollers and (2) support the ability to measure and/or generate signals. Communication between the automobile diagnostic test system and the vehicle's on-board microcontroller requires that the diagnostic test system be able to understand the different protocol(s) that a specific automobile may use. A second function that diagnostic test systems need to support is the ability to measure signals and/or generate signals. Measurement requirements can reduce to a handful of operations including the measurement of voltage and current. These measurements may produce a single-value response (e.g. an ohm-meter reading) or a series of values (e.g. an oscilloscope.) From the measurement information, it is possible to derive other data, such as the frequency of a signal.

FIG. 1A shows a block diagram of a traditional microcontroller controlled automotive test diagnostic system. The test diagnostic system includes a computer 102, a bus 106, a bus interface 118, a dual port RAM 130, a microcontroller 132, and analog circuitry 138. The computing means 102 typically includes a host processor 112, a chipset 114, and a host memory 116. The microcontroller 132 is electrically coupled to analog circuitry 138, where each analog circuit 138 can be connected to a different vehicle system part or system to be tested (e.g., electrical system, spark plug) through cables that connect to the instrumentation system.

FIG. 1B is a block diagram of a microcontroller 132 of the type which could be used in the test diagnostic system shown in FIG. 1A. The microcontroller 132 includes a processing means 140, a memory means 142 (typically including both ROM 144 and RAM 146 memory devices), a timer 148, an input port 150, an output port 152, and a serial interface 154. The processing means 140, memory means 142, the timer 148, the input port 150, output port 152 and serial interface 154 are all electrically connected via a bus 156. The bus 156 is connected to the dual port RAM 130 through the microprocessor's bus interface 158. The serial interface 154 is connected to the analog circuitry 138 via a serial bus 160.

Traditional automotive test diagnostic systems typically perform: (1) data conversion, (2) data processing, and (3) data output. The analog circuitry (which typically includes an A/D converter for input channels) is used to convert analog measurements to a digital format. Data processing is performed by a microcontroller. Processing steps typically include: control of the analog circuitry, acquiring the data from the analog circuitry, qualifying and filtering the data to determine useability, storing the data to system RAM, and converting the data values to the desired format. After processing, the data is retrieved and output as desired by the applications program.

In traditional automotive diagnostic systems, a microcontroller 132 performs the data processing tasks. After the microcontroller 132 has been configured and data has been collected, a typical sequence of events for data transfer from the microcontroller 132 to the host processor 112 is as follows. First, the host processor 112 is interrupted by the microcontroller 132. The host processor 112 then reads the collected input data from the dual port RAM 130 and stores the data values in memory 116. The data is converted into the desired format and the host processor 112 notifies the application program that the data is available in the main memory 116 for use.

The process for transferring data from the microcontroller is slow, since the microcontroller 132 must access memory to fetch the instruction (x clock cycles) and then execute the instruction (y clock cycles). For each input channel the microcontroller 132 must control the analog circuitry, filter/qualify the sample value, and store the data value before the next sample value arrives.

Consider as an example, the task of determining if a threshold value on an input channel has been crossed once the value is available in the digital domain. Determining if a threshold value has been crossed requires performance of the following series of steps in a microcontroller-based test diagnostic system. The host application writes a new command (e.g. to check for a specific threshold, channel number, and sampling rate) to the dual-port RAM 130 and the microcontroller 132 is interrupted in order to fetch the new command. The microcontroller 132 enters the interrupt-service routine (first prepares for ISR, then reads the routine from its program ROM). The microcontroller 132 then reads the new instrumentation command from the dual-port RAM 130 and configures the analog section 138 as is appropriate. The microcontroller 132 controls the analog to digital converter (ADC) and reads the ADC sample data. For each sample the microcontroller 132 reads, it checks the value of the sample to determine if the threshold has been crossed. When the microcontroller 132 determines the threshold has been crossed, the microcontroller 132 then reads the time value to indicate the time the condition was satisfied. The microcontroller 132 then places the timestamp value in the dual-port RAM 130 and the microcontroller 130 interrupts the host to notify it that it should retrieve the information from the dual-port RAM 130. The host-level device driver then enters an interrupt service routine, reads the information from the dual-port RAM and writes the information to the host memory.

The disadvantage of the vehicle diagnostic system 100 shown in Figure 1A is that the microcontroller 132 needs to execute commands for every operation it is involved in. Additionally, interrupting the host processor 112 to retrieve the data means that the host processor 112 will be continuously involved in the transfer of data from the dual-port RAM 130 to the host memory 116. This heavily loads the duties of the host processor, since it must frequently give up continuous blocks of its bandwidth to the task of data movements from the instrumentation peripheral 104 to the main memory.

Although a microcontroller based solution works well for low-speed systems which also have few instrumentation channels, problems arise when trying to support real-time data manipulation requirements for a high-speed channel (or many low-speed channels). For example, in an interrupt-based system, a dual port RAM that could hold 2 KB of data would have to interrupt the host 1000 times a second to sustain the required throughput of approximately 2 MB per second, the data rate of a typical high-speed channel.

Increasing the dual-port RAM capacity alleviates the problem, but with limited improvement and at a substantial cost. For example, increasing the dual-port memory size by a factor of 10 still requires interruption of the host at least 100 times per second (with each interruption lasting 10 times as long) just for data transfers.

Unfortunately, a microcontroller based solution cannot keep up with the real-time data analysis on high-speed data channels without heavily impacting the host's processing bandwidth. An automotive test diagnostic system which is capable of real-time data processing on sophisticated multiple, independent channels is needed.

SUMMARY OF THE INVENTION

The present invention provides an automotive test diagnostic system architecture which is capable of achieving high data rates through multiple, independent instrumentation channels. The test diagnostic system includes a vehicle diagnostic instrumentation controller, the vehicle diagnostic instrumentation controller comprising: an instrument peripheral interface means; an instrumentation control means, the instrumentation control means being further comprised of an arbitration control means, and a device interface means, wherein the arbitration control means is electrically coupled to the device interface means; and a first bus for electrically coupling the instrument peripheral interface means to the instrumentation control means. In the preferred embodiment, the instrumentation control means further includes a data qualification means and a data storage means for storing data. However, dependent on the rate of data transfer, the calculations required, etc., a data storage means may not be required for a particular channel.

The instrumentation controller is a register-based, reprogrammable data processing solution. Because the instrumentation controller is register-based, the instrumentation controller used in the present invention is capable of achieving faster data rates than conventional microcontroller based solutions which are dependent on software execution. The increased speed of the instrumentation controller allows control of the analog circuitry and data filtering to be performed real time. Further, because the instrumentation controller is hardware based, the delay for execution of an operation is precisely known. Thus, the present invention provides a much more deterministic solution than a software based solution, thus making a large range of performance objectives possible.

In general, a microcontroller does each instruction sequentially. This is in contrast to an instrumentation controller where operations for multiple channels can be performed in parallel. Since the microcontroller resource needs to be shared among the various steps, the speed of the activities possible is limited. Further, the instrumentation controller's modular internal architecture allows the steps to be executed in a decoupled, pipelined fashion, such that the independent parallel operation of the different steps allows for higher processing speed for each step. Thus, it is possible to do multiple comparisons in parallel, all within the framework of nanoseconds as opposed to microseconds or even milliseconds. Further, each of the multiple channels can operate at different operating frequencies, providing greater useability of the system.

The problem with a single resource (i.e. microcontroller) being in the path of each operation is compounded when more than one channel is desired. As the sampling speed of the ADC devices and the number of channels increases, the microcontroller capabilities reach a performance saturation point resulting in either loss of data and/or a deterioration in the overall functionality of the automotive test diagnostic system. In contrast, the instrumentation controller's modular architecture can support simultaneous control of multiple channels which can dramatically increase the bandwidth of the system.

In order to support the maximum instrumentation functionality at high speeds, the instrumentation controller is controlled through a custom hardware device. The objective is to perform as many tasks as possible in hardware so that the system performance is not impacted by the instrumentation controller's activities. On a system level, the functions performed by the instrumentation controller for an input channel include: acquiring data, transferring data to the host memory for use by the application. The process of acquiring the data may be such functions as collecting voltage values in a pass-through mode or checking for specific conditions of a signal. Examples of the later include monitoring and recording a signal's peaks and valleys (peak detection) or recording a timestamp when the signal crosses a certain voltage level (threshold crossing).

In one embodiment of the present invention, the instrument peripheral interface means includes a PCI bus. The PCI bus is a low latency, highly deterministic, high performance bus which can handle data transfer rates of up to 524 MB/sec. Because PCI buses have the capacity to implement bus mastership, data can be transferred between the instrumentation controller and the host processor memory without host processor intervention. Use of bus mastering eliminates the host's involvement from the data movement operations. The host is notified only after all of the data is already transferred.

A further advantage of the present test diagnostic system is its adaptability to future changes or updates to the test system, such as are due to a change in the processor or motherboard used in system implementation A further understanding of the nature and advantages of the present invention may be realized with reference to the remaining portions of the specification and the attached drawings.

DETAILED DESCRIPTION OF THE PREFERRED EMBODIMENTS

Figure 1A:
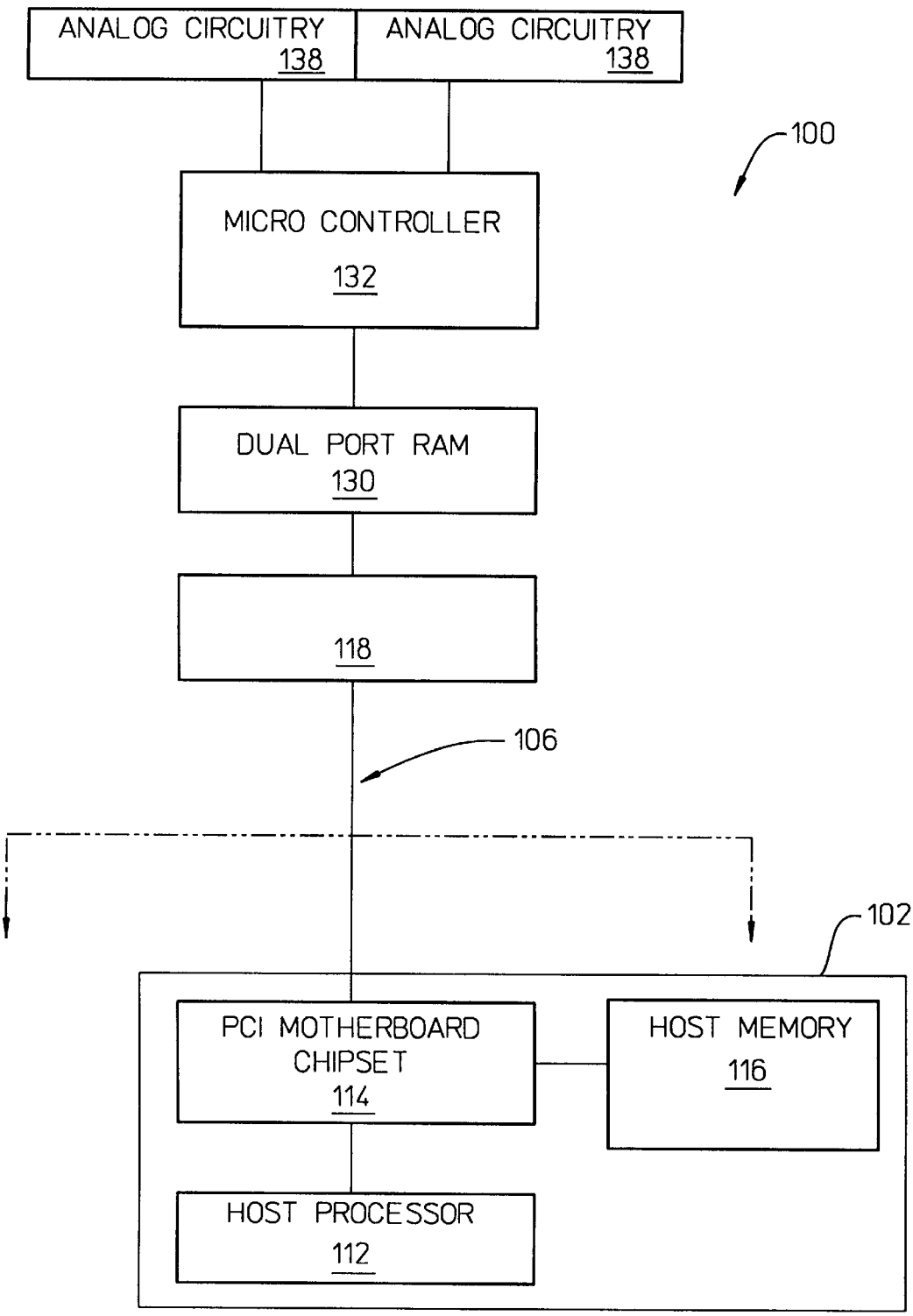
FIG. 1A shows a block diagram of a microcontroller controlled test diagnostic system.
Figure 1B:
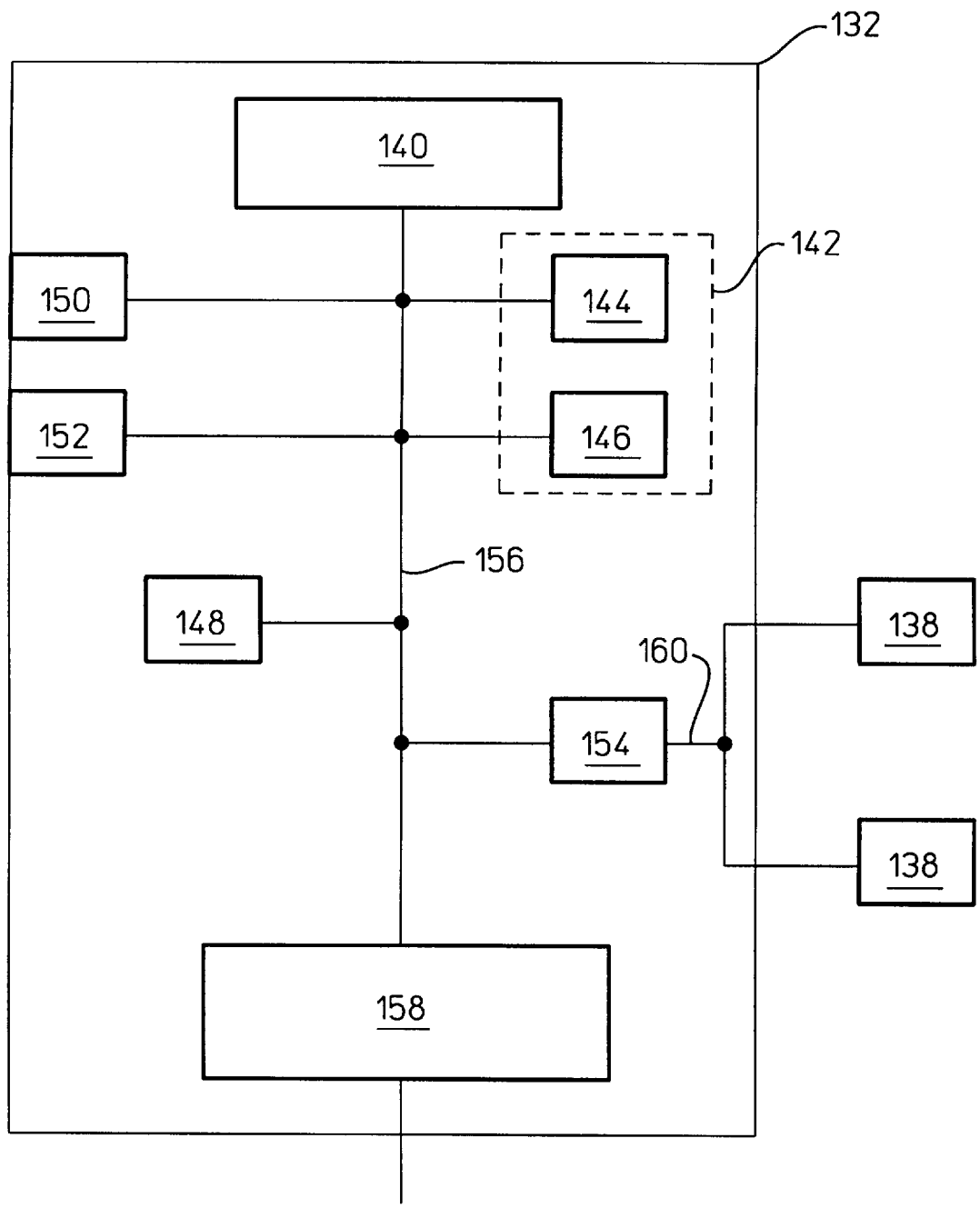
FIG. 1B shows a block diagram of a microcontroller.
Figure 2:
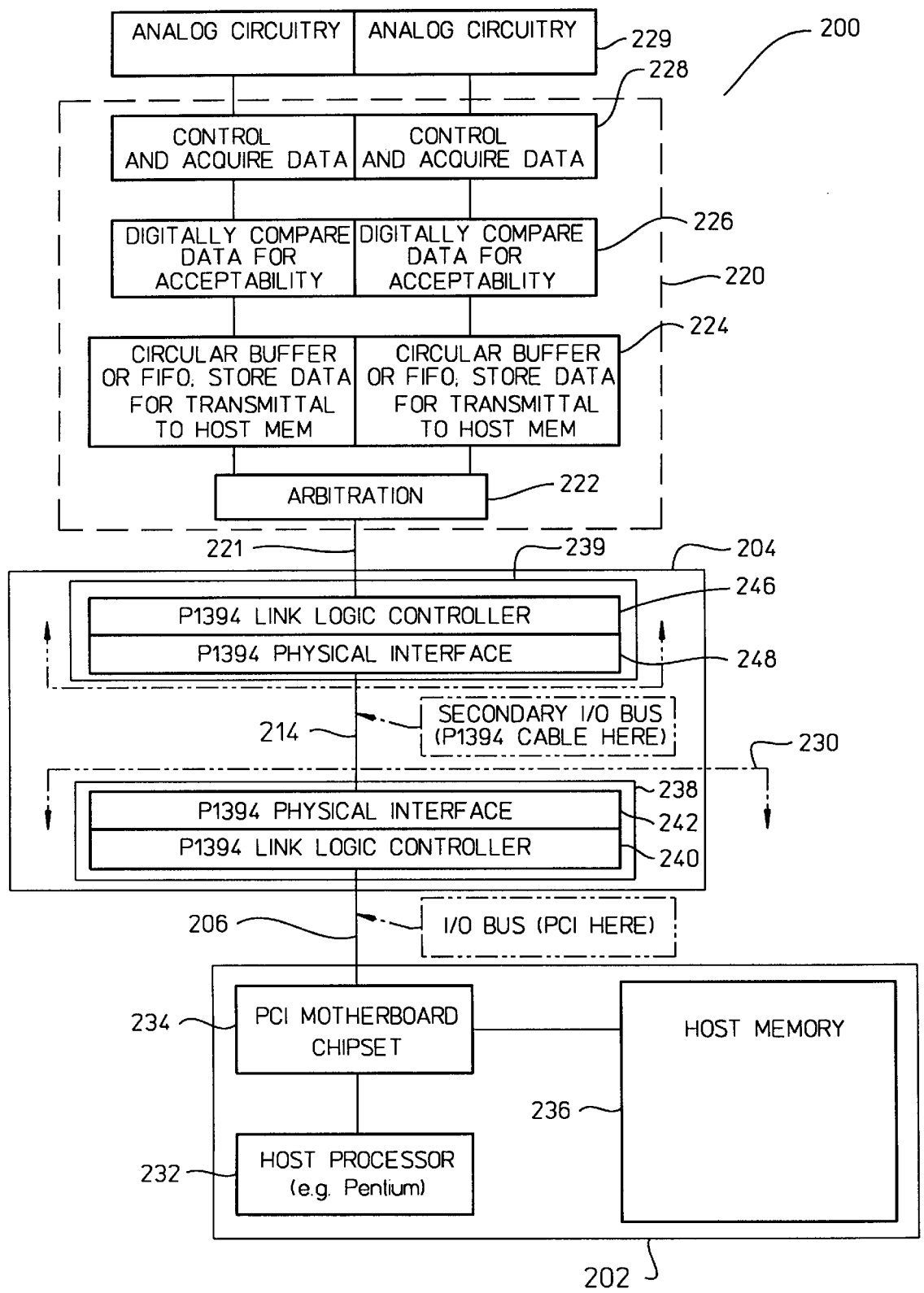
FIG. 2 shows a block diagram of a test diagnostic system according to one embodiment of the present invention.

FIG. 2 shows a block diagram of a test diagnostic system 200 according to the preferred embodiment of the present invention. The test diagnostic system 200 includes a vehicle diagnostic instrumentation controller 220 comprising: an instrument peripheral interface means 204; an instrumentation control means 220, the instrumentation control means 220 being further comprised of an arbitration control means 222 and a device interface means 228, wherein the arbitration control means 222 is electrically coupled to the device interface means 229; and a first bus 221 for electrically coupling the instrument peripheral interface means 204 to the instrumentation control means 220.

In the preferred embodiment, the instrumentation control means 220 further includes a data qualification means 226 and a data storage means 224 for storing data. However, dependent on the required functionality or mode of the instrumentation channel, the rate of data transfer, the calculations required, etc., a data storage means 224 or a data qualification means 226 may not be required for a particular channel. Typically, the data storage means 224 is electrically coupled to the arbitration control means 222 and the data qualification means 226 is electrically coupled to the device interface means 228.

The test diagnostic system includes: a computing means 202; an instrument peripheral interface means 204; a third bus 206 for electrically coupling the computing means 202 to the instrument peripheral interface means 204; an instrumentation control means 220, the instrumentation control means 220 being further comprised of an arbitration control means 222, and a device interface means 228; and a first bus 221 for electrically coupling the instrument peripheral interface means 204 to the instrumentation control means 220.

In the embodiment shown in FIG. 2, the computing means 202, the third bus 206, and the a component of the instrument peripheral interface means 204 are physically located on a main system motherboard 230. The computing means 202 typically includes a host processor 232, a chipset 234, and a host memory 236.

The computing means 202 is typically electrically coupled to the instrument peripheral interface means 204 by a third bus 206. In the implementation shown in FIG. 2, the third bus 206 is a PCI bus. The instrument peripheral interface means 204 electrically couples the computing means 202 to the instrumentation control means 220. Data may be transferred from the computing means through either an I/O bus such as ISA, PCI, or P1394 or through an extended medium such as a LAN that may be either wired or wireless.

After data acquisition by the instrumentation controller 220, data is transferred to host memory 236. Referring to FIG. 2, the instrument peripheral interface 204 can be a bus interface or a network interface. If the instrumentation interface 204 is a network interface it can be either wire or wireless. If the instrumentation interface 204 is a bus interface it can include a number of buses including but not limited to an ISA, PCI or P1394 bus.

In one embodiment, the instrumentation peripheral interface means 204 includes a PCI bus. PCI buses provide high performance (bandwidth of over 500 MB per second is possible), support for plug-and-play systems, support for a lower-power system through the usage of 3 volt signals, and bus mastership. The instrumentation controller 220 transfers the information in a bus master mode (acting as a PCI bus initiator). Use of bus mastership effectively eliminates the need for the host processor's involvement during the acquisition and transfer operations. The host processor is notified only after all of the data is already transferred. The instrumentation controller 220 independently transfers the data for each channel to the host's memory. After the data is transferred to host memory, the data is processed. This step represent the first involvement of the host processor after it has configured the instrumentation controller for data acquisition.

In the embodiment shown in FIG. 2, the instrument peripheral interface means 204 is comprised of a first data interface means 238, a second data interface means 239, and a second bus 214 for electrically coupling the first data interface means 238 to the second data interface means 239. The first data interface means 238 includes a link logic control means 240 and a physical interface means 242. Similarly, the second data interface means 239 includes a link logic control means 246 and a physical interface means 248. In one embodiment, the second bus 214 is an IEEE 1394 cable. Thus, both link logic control means 240, 246 and both physical interface means 242, 248 are designed to interface with a P1394 cable.

The instrumentation controller 220 typically includes an arbitration controller 222; a data qualifying unit; and a device interface unit 228 for controlling and acquiring data and a data storage unit 224. Typical functions of the device interface unit 228 include interfacing and controlling the analog section, acquiring data from the data input channels (ADC), sending data to the output channels (DAC), and configuring the analog section. Configuring the analog section is typically done via a serial bus which initializes serial shift-register like latches in the analog section (used for setting analog relays, switches, and muxes). Alternatively, if the instrumentation controller pin quantity limitations do not exist, the signal can be in parallel instead of serial.

Typical functions of the data qualification unit 226 include: deciding what to do with the data (dependent on the mode used for the channel), qualifying the data for submittal to the data storage unit (in the case of the inputs), sends data to the device interface unit for output (in the case of the output channels), controls and assures uninterrupted data flow to and from the device interface unit and the data storage unit, attaches status fields and timestamps where appropriate.

The data storage unit 224 is used to increase system performance by buffering incoming and outgoing data. The size of the data storage unit can be adjusted dependent on the channel's expected performance requirements. Different types of memory storage devices may be used. For example, the data storage unit may be a FIFO, a circular buffer, a small dual-port RAM or simply a few registers. Further, the data storage capacity may be increased by using additional memory outside of the vehicle instrumentation controller, but still on the instrumentation peripheral card.

The bus interface unit interfaces the instrumentation controller with the system bus. This allows configuration of the instrumentation controller by the host or other processors external to the instrumentation controller peripheral card. The bus interface unit transfers data bidirectionally to the host memory or other external memory.

Figure 3:
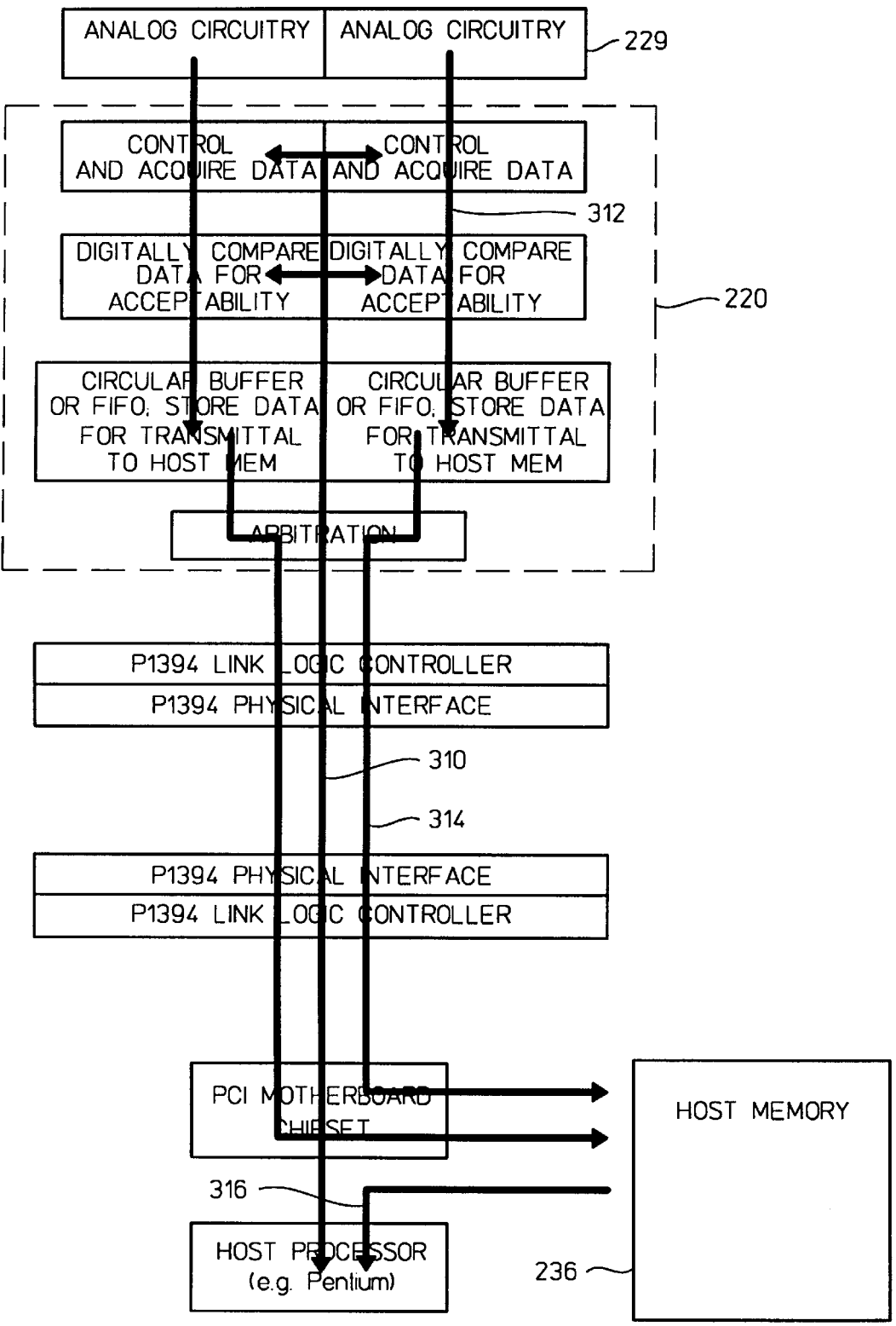
FIG. 3 shows a combined block diagram and sequence of events for the present invention.

FIG. 3 shows a sequence of events for acquisition of data according to the architecture implementation shown in FIG. 2. The first step (step 310) in the device interface process is a request from the host processor 232 for data samples from the instrumentation control means 220. After the host processor request, the instrumentation control means 220 processes the data sample request. During the data processing step (312), the instrumentation controller 220 independently controls the analog circuitry 229, qualifies and collects the data independently so that the host processor 232 can perform other tasks. Once a sufficient number of data samples has been collected, the instrumentation controller 220 transfers the data to the designated memory location (step 314). After data is transferred to the designated memory location, the host processor 232 is notified that the data is stored in memory 236. Application programs running on the host processor 232 may then read the data stored in memory 236.

The following is a discussion of the steps involved in the task of determining if a threshold value has been crossed once the value is available in the digital domain. Compared to the implementation in a microcontroller (and described in the Background of the Invention), the number of steps is decreased and the time to implement the task is decreased. The first step in implementing the task is a request by the host application via the instrumentation device driver which writes a new command to the instrumentation controller 220. The instrumentation controller 220 configures the analog section 229 as appropriate. The instrumentation controller 220 controls the analog to digital converter (ADC) in the analog section 229 and reads the ADC sample data. The instrumentation controller 220 reads each sample and then checks the sampled data to determine if the threshold value has been crossed. When the instrumentation controller 220 determines the threshold has been crossed, the instrumentation controller 220 places the timestamp in the appropriate data storage location. The instrumentation controller 220, via the instrument peripheral interface 204, transfers the data to the appropriate location in system memory 236. The instrumentation controller 220 then notifies the driver or the application of the data availability in system memory 236.

An advantage of using the instrumentation controller 220, is that the operations for multiple channels can be performed in parallel. In general, a microcontroller based solution needs to do each instruction sequentially. The above sequence of steps is for the scenario when a single value, in this case the threshold crossing time, is returned. If the application desires the channel to continue sampling the ADC 229 and return a timestamp value for each threshold crossing or alternatively to continue until a specific condition satisfied, the steps after the step of configuring the analog section 229 needs to be repeated indefinitely until the stop condition is satisfied. For a microcontroller based resource this means in effect that the resource needs to be shared among the various steps, limiting the speed of activities possible. In contrast, the instrumentation controller's modular internal architecture allows the steps to be executed in a decoupled fashion, such that the independent parallel operation of the different steps allows for higher processing speed for each step. Further, the activities within each channel may be pipelined to facilitate extremely fast data acquisition rates.

The problem with a single resource (microcontroller) being in the path of each operation is compounded when more than one channel is desired. Depending on the sampling speed of the ADC devices and the number of channels implemented, the microcontroller capabilities would sooner or later get over utilized, resulting in either loss of data and/or a deterioration in the overall functionality of the automotive test diagnostic system. In contrast, the instrumentation controller's modular architecture can support simultaneous control of multiple independent channels which can dramatically increase the bandwidth of the system.

Figure 4:
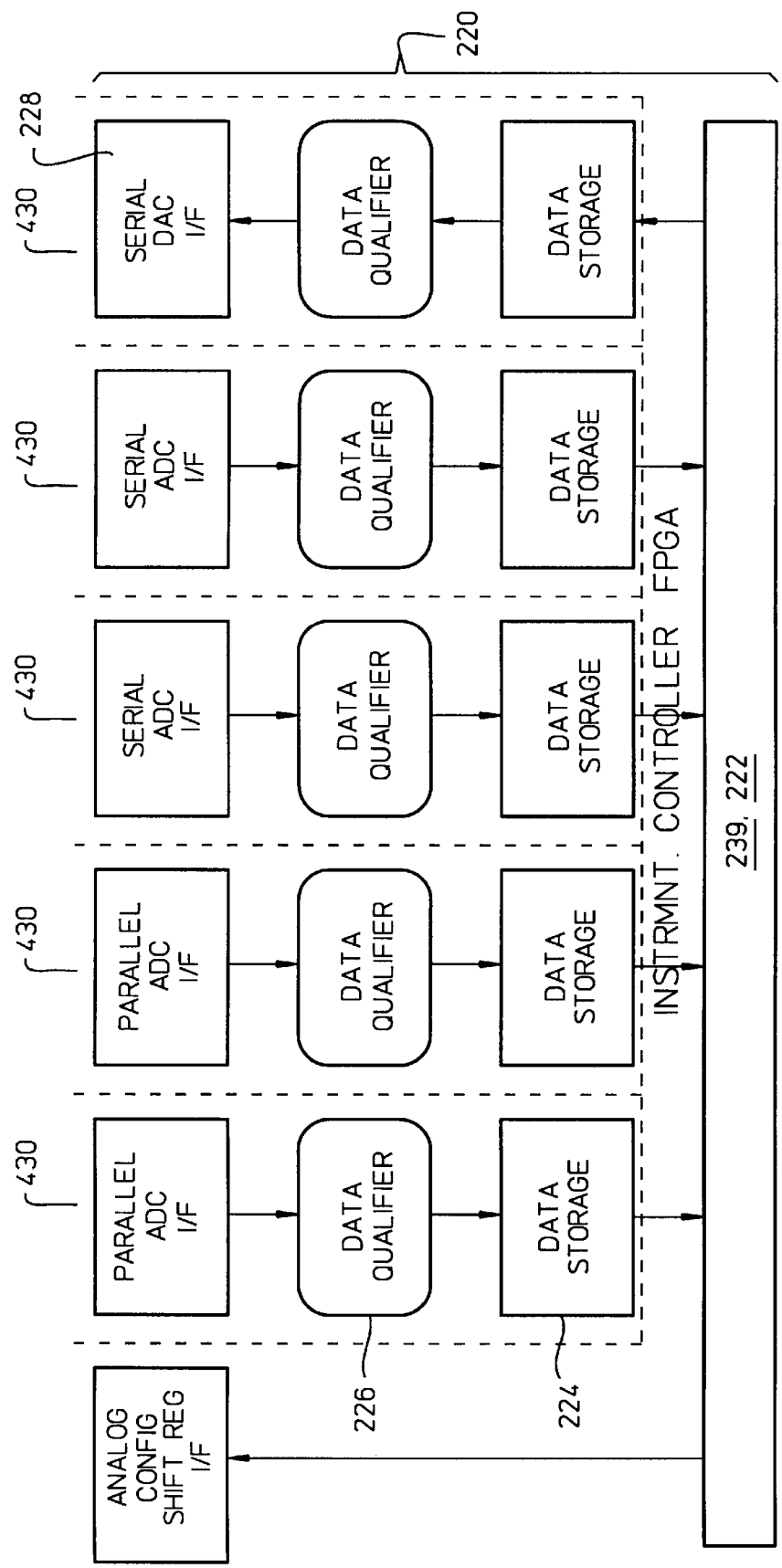
FIG. 4 shows a block diagram of an instrumentation controller.

FIG. 4 shows a block diagram of the instrumentation controller 220. In the embodiment shown in FIG. 4, the functionality of the arbitration control means and 222 the second data interface 239 are combined. The dotted lines are representative of the different channels 430 in the instrumentation controller shown in FIG. 4. Each channel 430 represents a self contained path for data including the control need for that data.

Figure 5:
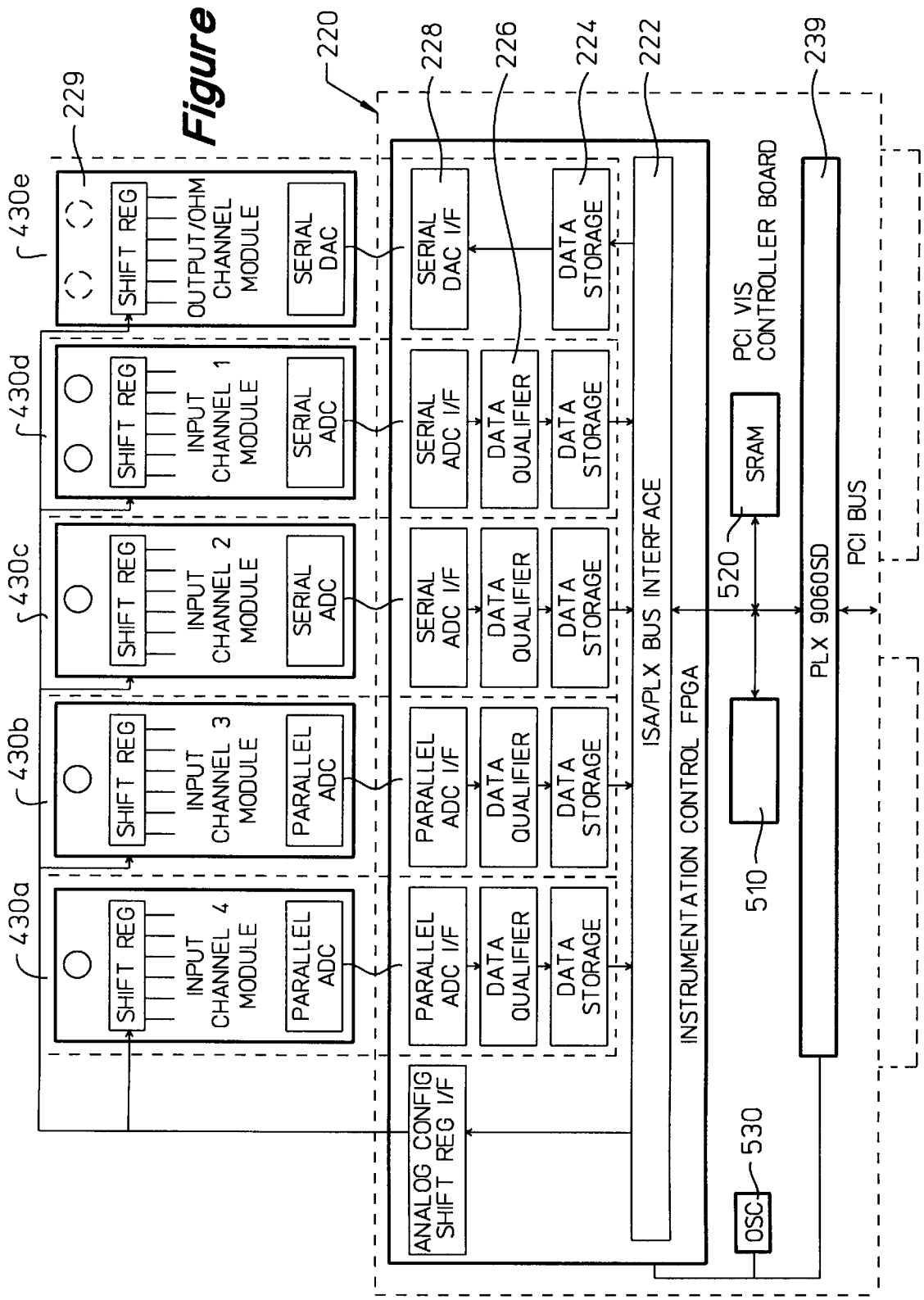
FIG. 5 shows a block diagram of an instrumentation controller configuration for used with a PCI bus.

Referring to FIG. 5, shows a block diagram of components physically located on the instrumentation controller card. The instrumentation controller card typically includes an instrument controller 220 and the second data interface 239. Each channel includes an arbitration control means 222 and a device interface unit 228. The instrumentation controller may or may not includes a data storage means 224 and a data qualifier means 226. Typically, the data storage means 224 is electrically coupled to the arbitration control means 222 and the data qualification means 226 is electrically coupled to the device interface means 228, although other interconnections between the arbitration control means 222, the data qualification means 226, the device interface means 228 and the data storage means 224 are possible.

It is optional for the instrument peripheral interface means 204 be implemented either inside of the instrumentation controller or outside of the instrumentation controller or internal or external to the instrumentation board which the instrumentation controller is physically located on. This choice is made dependent on the bus interface size and the hardware instrumentation size. Similarly, it is optional to have the data storage either inside the instrumentation controller or outside the instrumentation controller. The memory location partitioning is flexible and again is dependent on the desired target size for the instrumentation controller. Dependent on the combination used, it is possible to have different levels of instrumentation controller activity for these steps.

Figure 6:
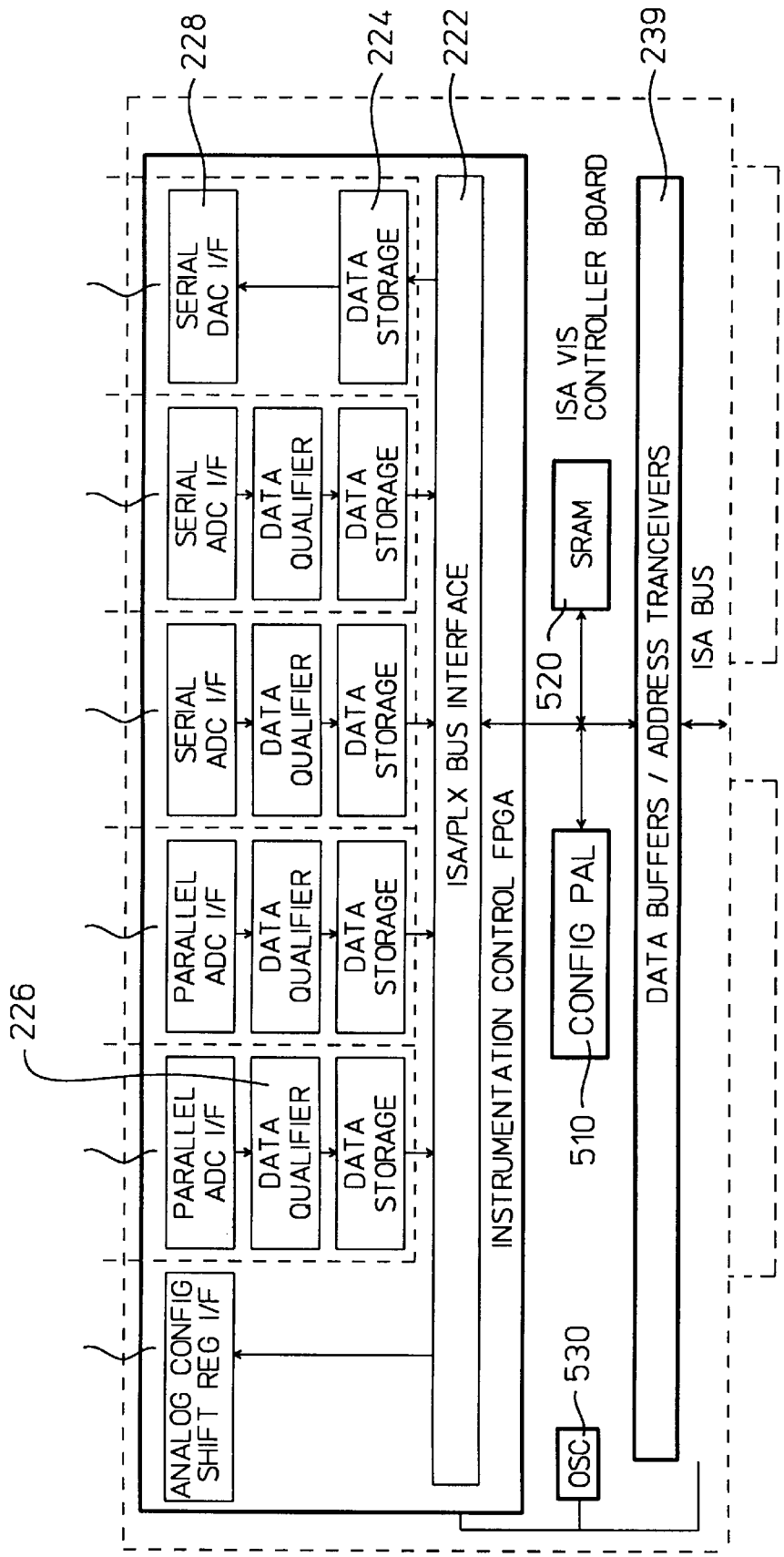
FIG. 6 shows a block diagram of an instrumentation controller configuration for use with an ISA bus.

FIG. 5 shows a block diagram of a vehicle instrumentation subsystem board for a PCI bus. FIG. 6 shows a vehicle instrumentation subsystem board for an ISA bus. In the embodiment shown in FIGS. 5 and 6, the components on the instrumentation controller board include the instrumentation controller 220, a second data interface means 239, an instrumentation configuration memory means 510, and an instrumentation controller memory means 520.

The second data interface 239 means is electrically coupled to the instrumentation controller 220 by an instrumentation controller bus 221. Both the instrumentation configuration memory means 510 and the instrumentation controller memory means 520 are electrically coupled to the instrumentation controller bus 221. The instrumentation configuration memory means 510 is used to facilitate configuration of the instrumentation controller when powering up.

In one embodiment, an SRAM-based reprogrammable device (e.g. FPGA) is used to implement the instrumentation controller. This allows for future upgrades or functionality modifications in the field without requiring system board changes. It is also possible to implement the instrumentation controller in an ASIC, which does not need a power-up configuration. However, an ASIC implementation would prohibit large modifications in the field. SRAM-based FPGAs need to be programmed upon power-up. This can be achieved by having the host perform the power-up programming directly or alternatively through the use of an on-board power-up configuration memory.

If a FPGA or CPLD type of device is used, the instrumentation controller further includes a power-up configuration memory means. In one embodiment, the power-up configuration memory means is comprised of a pair of 32K×8 Flash ROMs. If the host performs the power-up configuration, the power-up configuration memory means is typically a configurable PAL. However, when the host performs the power-up configuration, no power-up configuration memory means may be required. The configuration PAL facilitates the host configuration of the instrumentation controller FPGA. Preferably, the instrumentation configuration memory means are memory devices which are electronically programmable. Using electronically programmable memory devices, allows changes to be made in the configuration of the instrumentation subsystem without physically removing the instrumentation configuration memory 510.

The instrumentation controller memory means 520 is typically used for buffering arbitrary waveform data to be sent to the data storage means 224 for output channel shown in FIG. 5. Although the size of the instrumentation controller memory means 520 may vary, a typical implementation would be a single 32K×8 RAM. In addition, a larger size memory 520 may be used to augment the internal data storage means 224.

The analog circuit module 229 includes circuitry for interfacing the signals from the parts under test (typically analog signals) to the instrumentation controller 220. Typical components in the analog circuit module 229 include: connectors, attenuators, AC or DC coupling parts, analog muxes, amplifiers, analog switches, relays, ADCs (for input channels), DACs (for output channels) and passive components like resistors and capacitors. The embodiment shown in FIG. 5 shows five data channels 430; four input channels and one output channel. The channels 430 includes two high speed parallel inputs 430a, 430b, two low speed serial inputs 430c, 430d, and a low speed serial output 430e. The dedicated instrumentation channels 430 include analog circuitry 229. The dedicated instrumentation channels are electrically coupled to different vehicle components or systems.

Figure 7:
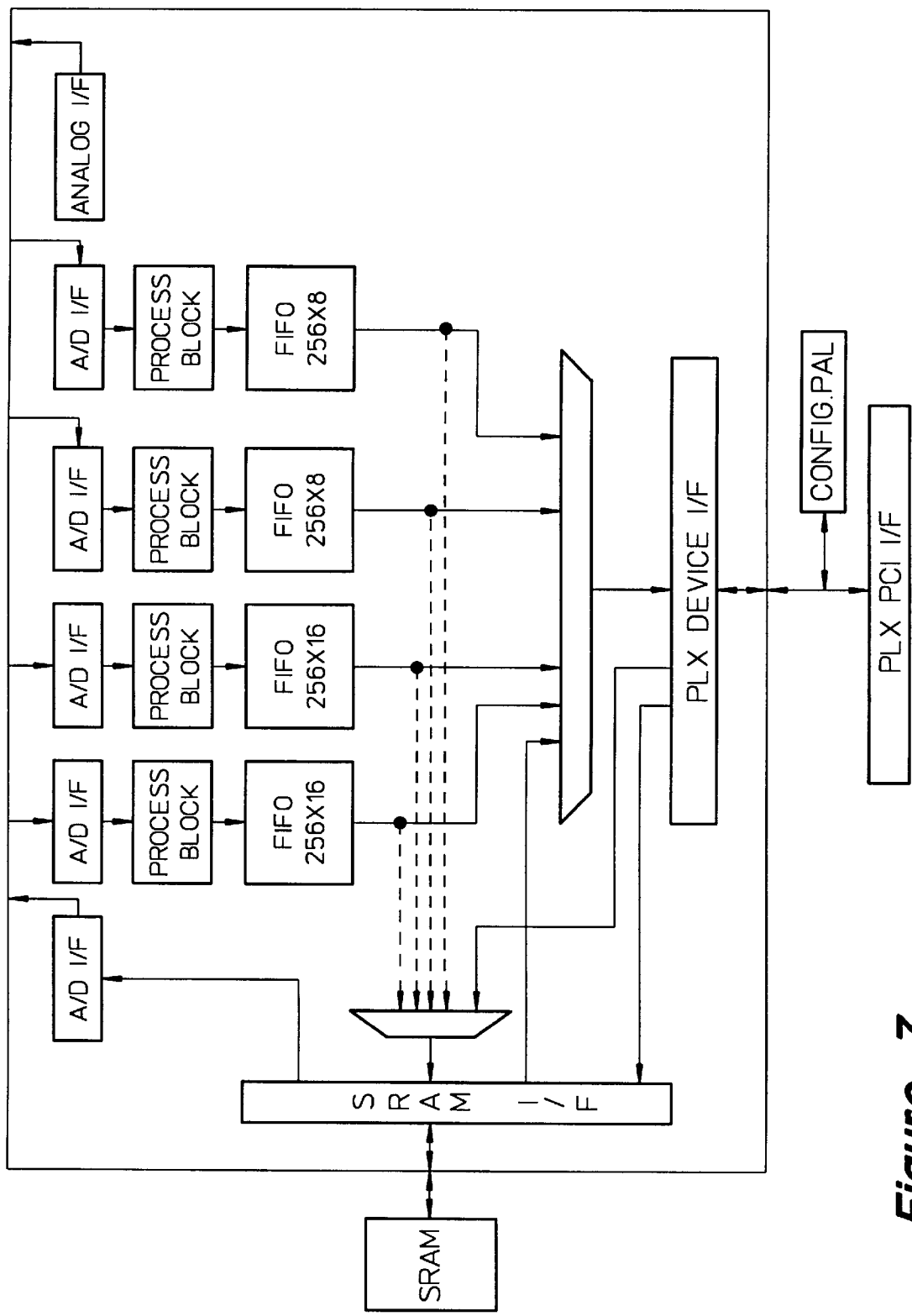
FIG. 7 shows an alternative memory configuration for the instrumentation controller according to an alternative embodiment of the invention.
Figure 8:
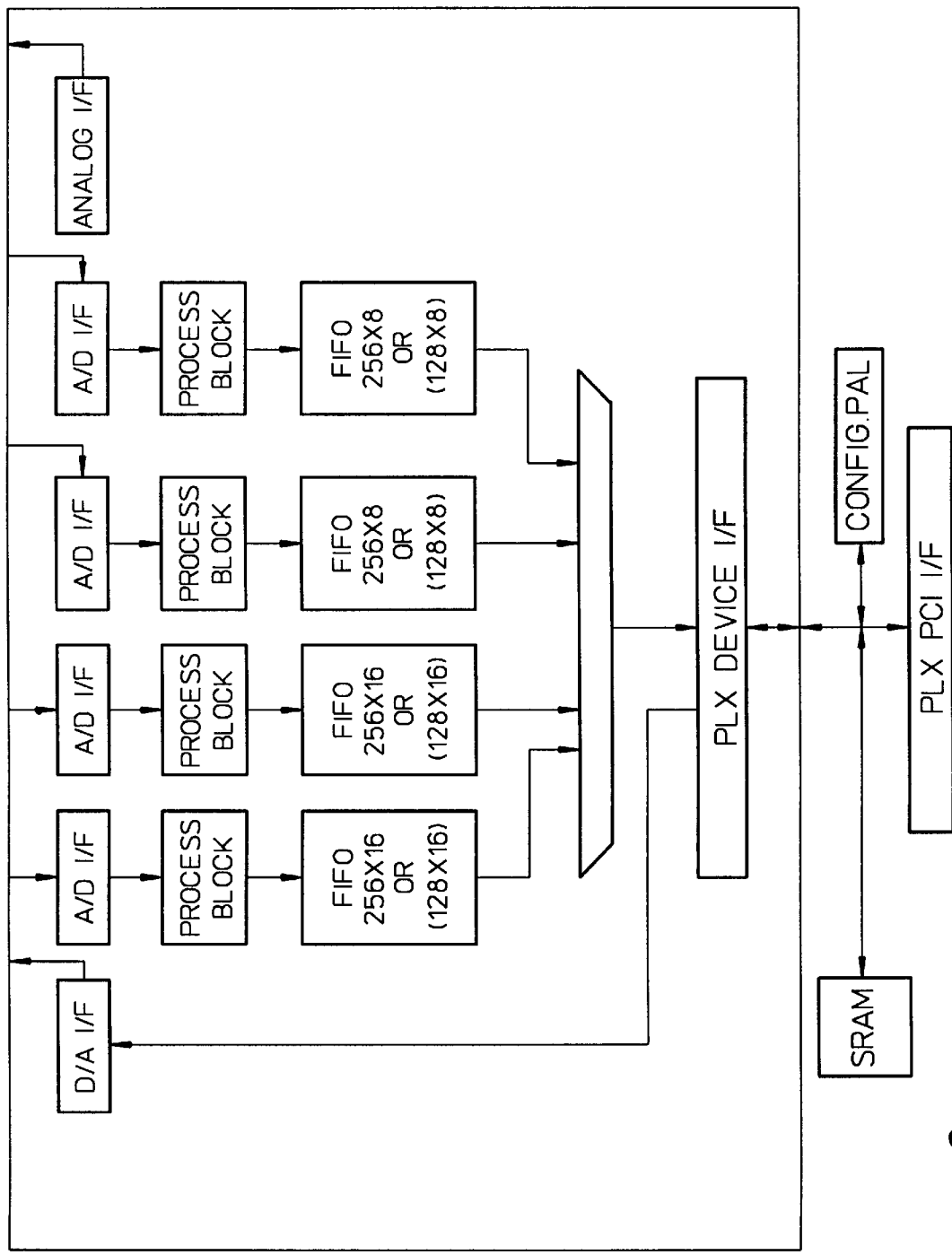
FIG. 8 shows an alternative memory configuration for the instrumentation controller according to an alternative embodiment of the invention.

It is possible to use data storage units 224 for storage of data from either input channels or output channels. Although the direction of data flow is reversed, the operation is analogous. In addition, the size of the data storage unit 224 is adjustable. It is possible to supplement the instrumentation controller's internal data storage with external memory, or to completely replace it with external memory. FIGS. 7 and 8 are block diagrams of two different configuration for supplementing the instrumentation controller's internal data storage with external memory.

The size of the data storage unit and whether the data storage unit needs to be supplemented or replaced with external memory needs to be considered in line with the number of channels desired, the preferred speed of operation on the channels, the system bus that is used, and the expected performance of the system. In general internal data storage units are preferred; and external supplemental storage units are desired if the bus is slow and an extended amounts of data collection is required.

The data storage units within the instrumentation controller 220 serve several functions, including: being a de-coupling and synchronizing mechanism between the bus instrument peripheral interface unit 204 and various device interface units 226; acting as a queue for the incoming data (in the case of input channels) or outgoing data (in the case of the output channels); and allowing for system tuning (matching the desired instrumentation capabilities to the performance limits of the host system and the bus characteristics). All of these factors need to be considered when choosing the data storage scheme and the data storage depth. For example, if two channels have a very slow data rate and the test diagnostic system allows inter-mixed data points, the two channels may share a single buffer. In the aforementioned case, either the instrument peripheral interface unit 204 can separate the data and send them to different host memory locations (in the case of inputs) or the host-level driver or application software can separate the data. Similarly, the depth of the storage unit can be anything from one value deep to an unlimited depth. A depth of one value deep is appropriate if the respective channel's performance requirements are dramatically less than the bandwidth available on the system/system bus. For large data storage requirements, it usually makes more sense to have some buffering internal to the instrumentation controller 220, augmented with external memory.

Another variable in determining the specifications of the data storage unit 224 is the type of storage that is used.

FIFOs, multiple ping ponged FIFOs, dual-port RAMs, and circular buffers are common types of data storage that may be used in the implementation of the instrumentation controller. The combination of the channels being simultaneously used also influences how the storage scheme should be implemented. In summary, at least some minimal data storage for de-coupling of the internal units is desired to allow the maximum utilization of the instrumentation controller's architecture.

The host computer 202 will execute application software which can issue commands for the instrumentation controller 220. These instructions are translated to initialization and configuration of registers contained in the instrumentation controller 220. The instrumentation controller 220 contains a series of registers that are mapped into the PC address space. These registers control state machines in the instrumentation controller, which in turn executes the desired operations. If the operation includes acquisition of data, the data is acquired, and sent to the host computer's main memory 236. A similar process takes place if the instrumentation controller is to generate data, as in the case of a waveform generator; if data is being output, the data transfer direction would be opposite that of the device interface process.

Figure 9:
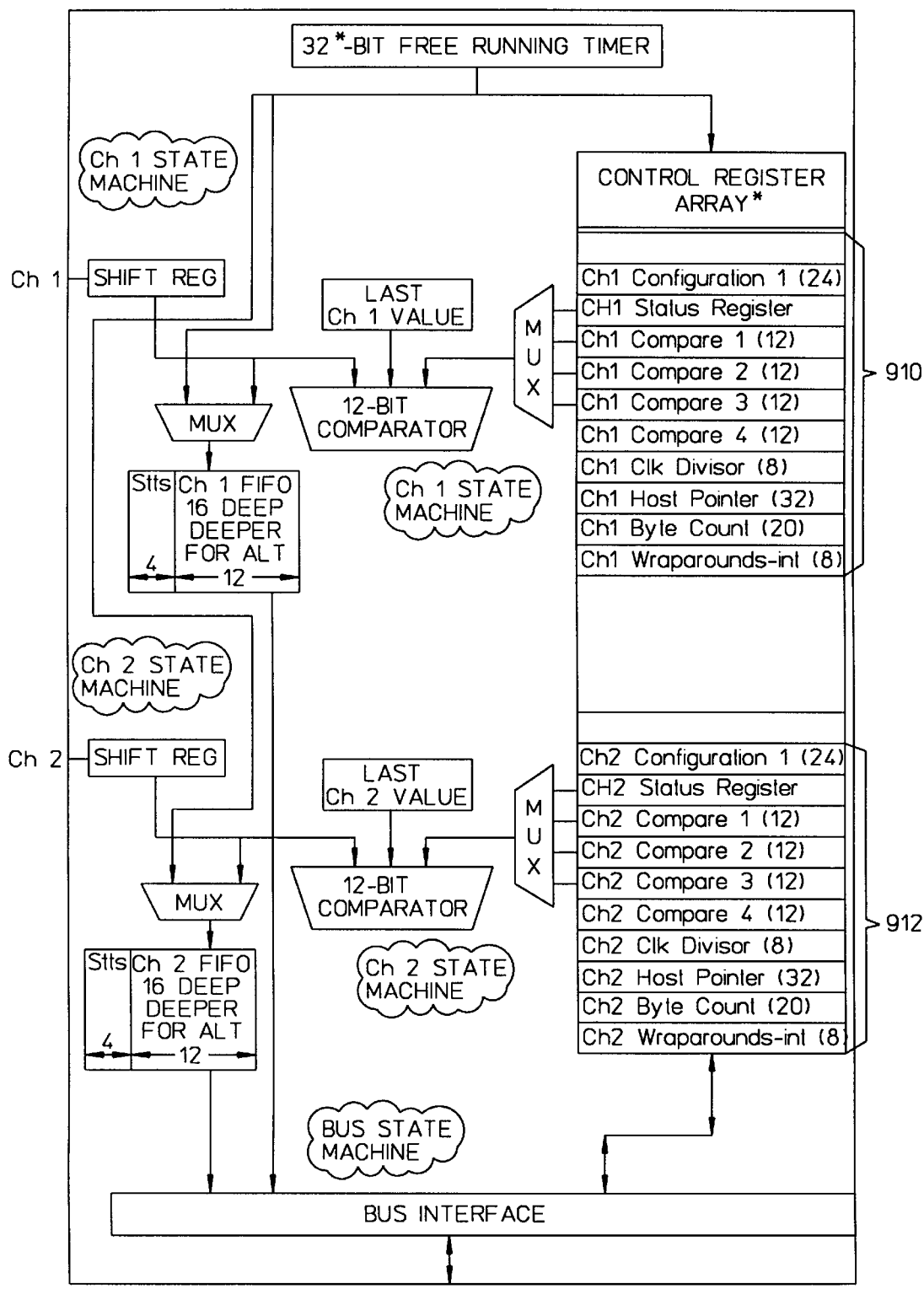
FIG. 9 shows a conceptual overview of the low speed input channels 1 and 2 of the instrumentation controller.

FIG. 9 shows a conceptual overview of the low speed input channels 1 and 2 of the instrumentation controller subsystem. User defined configuration registers 910 and 912 store information corresponding to the specific configuration of their corresponding channels. For example, if channel 1 is configured to perform the task of threshold detection, a threshold value to which sampled values are compared would be stored in user defined configuration registers 910. The user defined configuration registers 910 and 912 control features and instrumentation functionality of the channel and are defined by the user.

The application program via the instrumentation driver accesses the bus interface and writes the user specified information to the user defined configuration registers 910, 912. Channels 1 and 2 are electrically coupled to the ADC of 229 of the channel module 430. The instrumentation controller 220 uses the information stored in the user defined configuration registers to configure the analog circuitry of the analog channel module 430. The data acquisition means 228 then samples the data from the analog circuitry 229. The function of the acquisition means is controlled by a state machine which is determined for each channel. The logic of the state machine is typically implemented in a hardware circuit.

After the data has been sampled by the data acquisition means 228, it is checked to see if it has the predetermined condition by the data qualifying means 226. The function of the data qualifying means is controlled by the state machine which corresponding to the channel.

Once a piece of data satisfies the predetermined condition, then the instrumentation controller places the sampled value, the timestamp, or both, or status information dependent on the mode of operation in the appropriate data storage position in the data storage means 224. The instrumentation controller then transfers the data, via the bus master interface, into the appropriate location in system memory.

Figure 10:
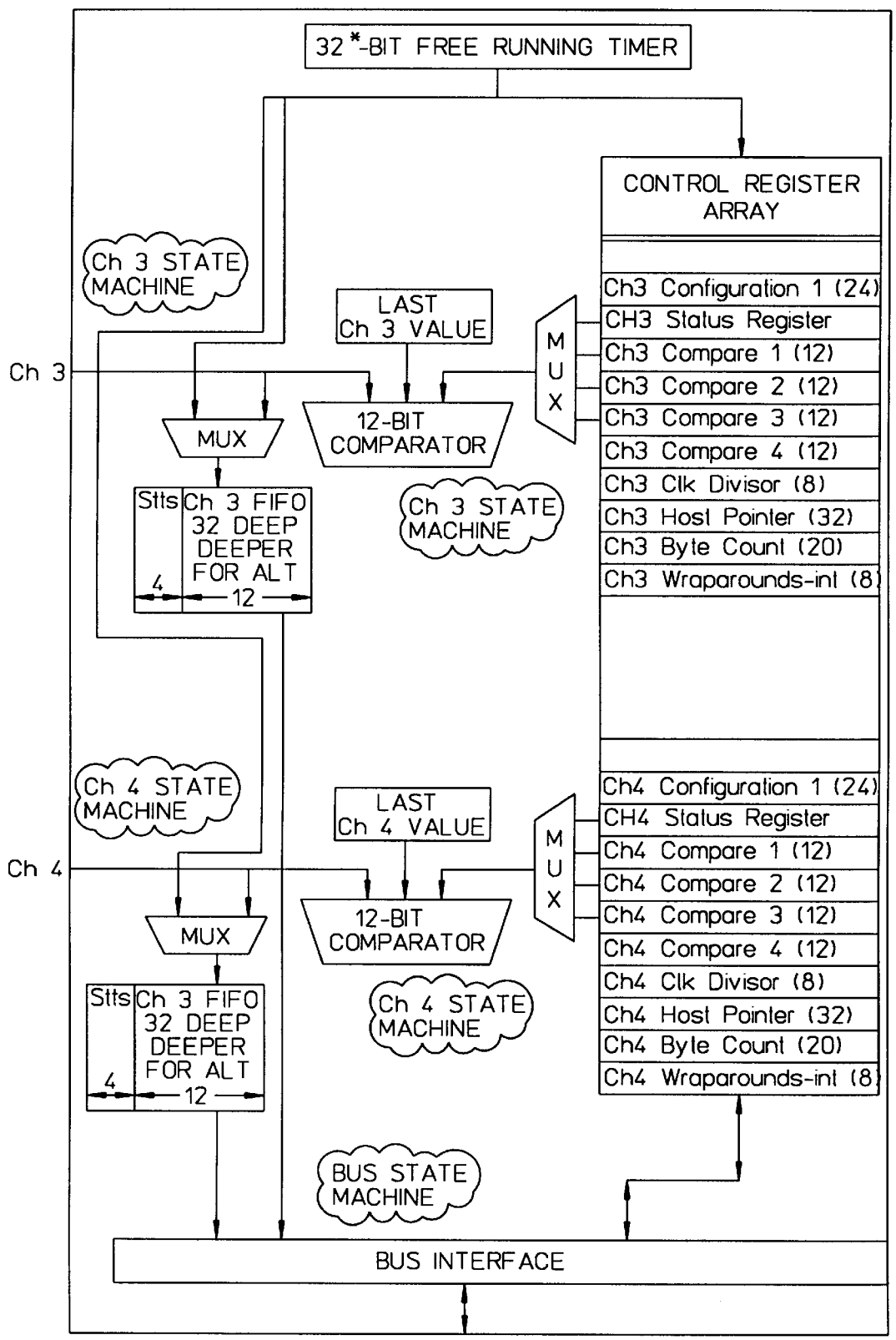
FIG. 10 shows a conceptual overview of the high speed input channels 3 and 4 of the instrumentation controller.
Figure 11:
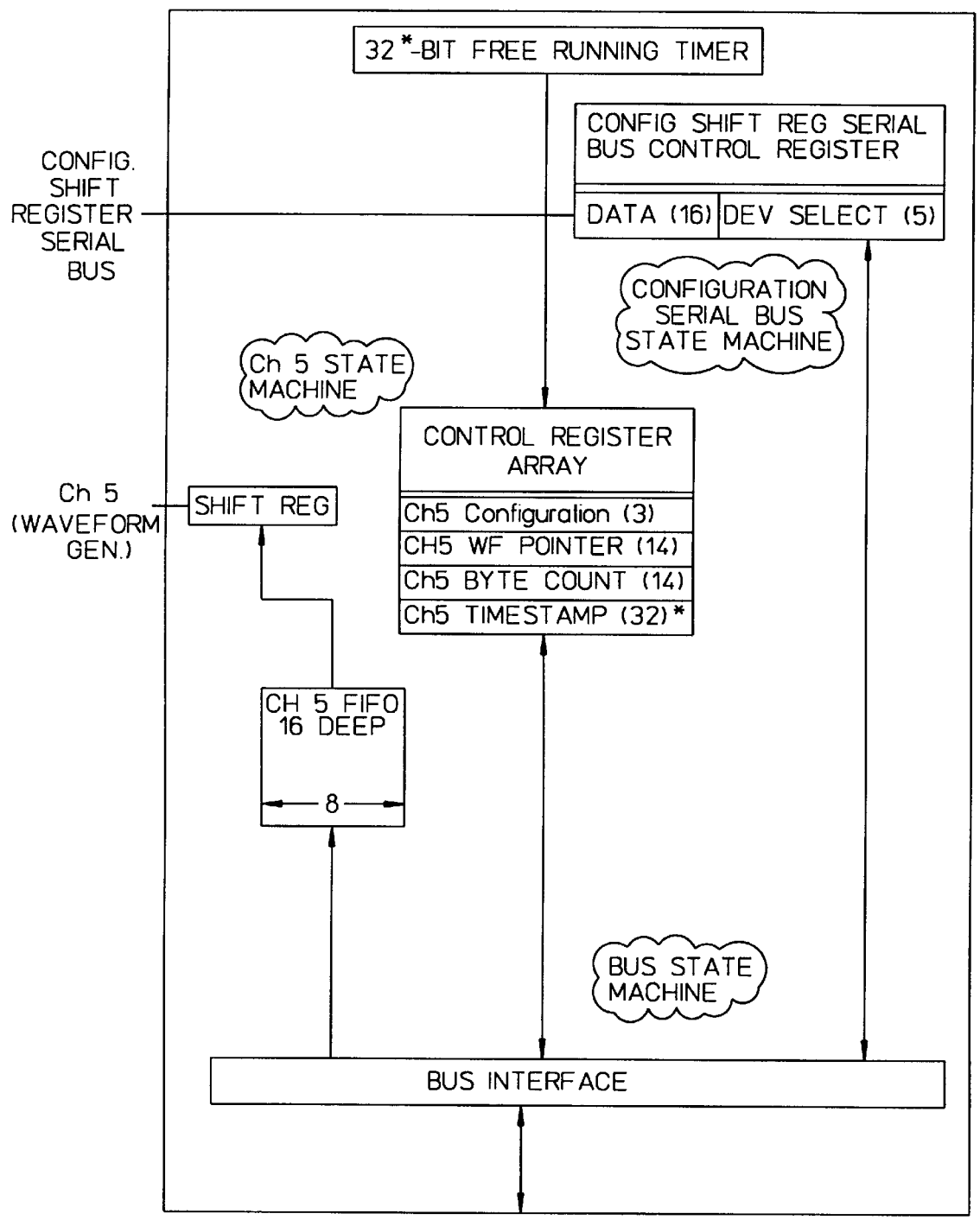
FIG. 11 shows a conceptual overview of the output channels and analog configuration of the instrumentation controller.

FIG. 10 shows a conceptual overview of the high speed input channels 3 and 4 of the instrumentation controller subsystem. The configuration of channels 3 and 4 is similar to the configuration of channels 1 and 2 shown in FIG. 9. However, the configuration of the device interface means is changed to support a parallel ADC interface. FIG. 11 shows a conceptual overview of the output channels and analog configuration sections of the instrumentation controller subsystem.

Figure 12:
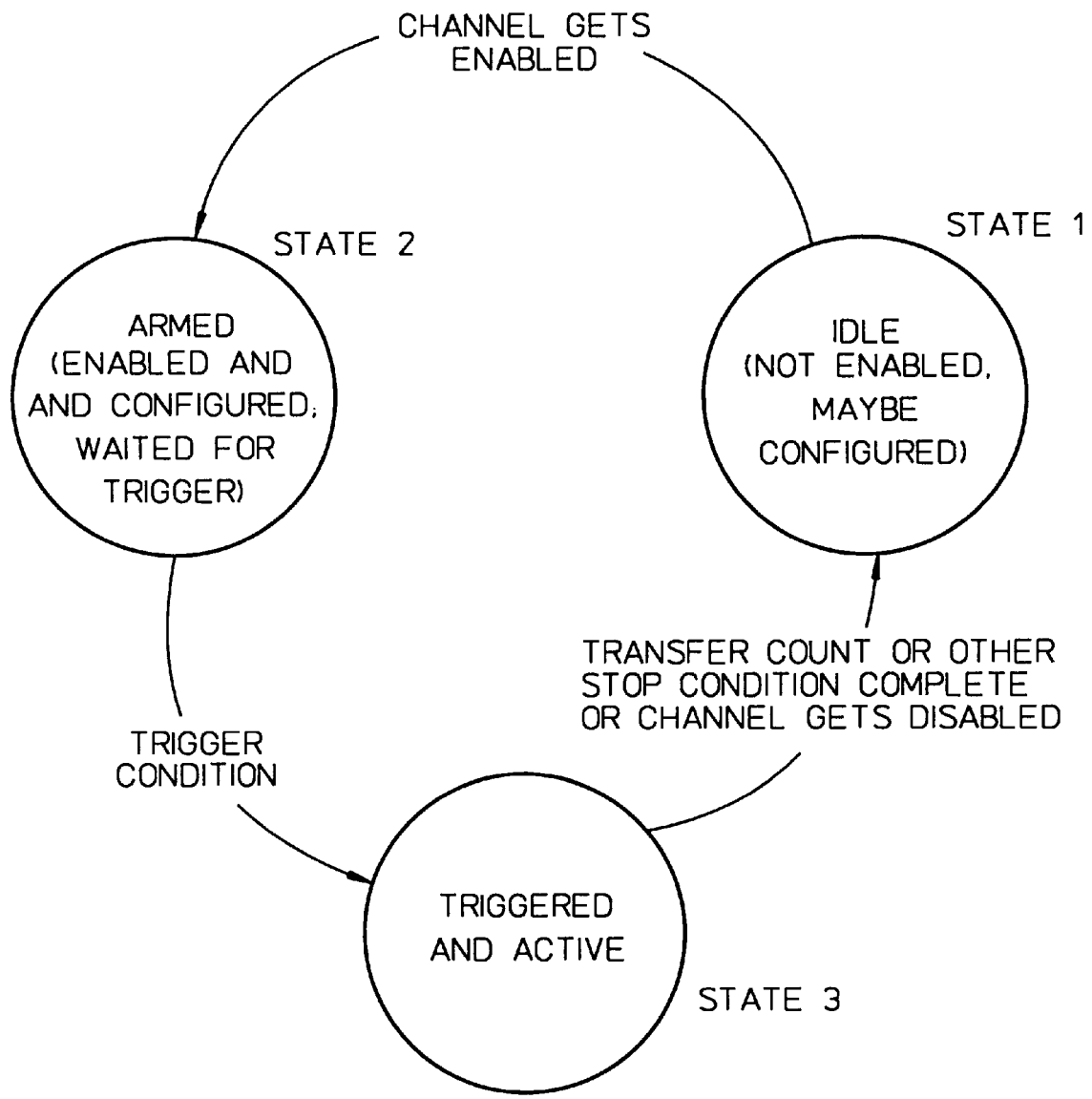
FIG. 12 shows a state diagram for the theory of operation for the instrumentation controller subsystem according to the present invention.

FIG. 12 shows a state diagram for the theory of operation for the instrumentation controller 220 according to the present invention. The state diagrams shown in FIGS. 13A, 14A, and 15–17 includes all of the three states shown in FIG. 12: idle (not enabled, although may be configured); armed (enable and configured, waiting for trigger); and triggered and active.

Figure 13A:
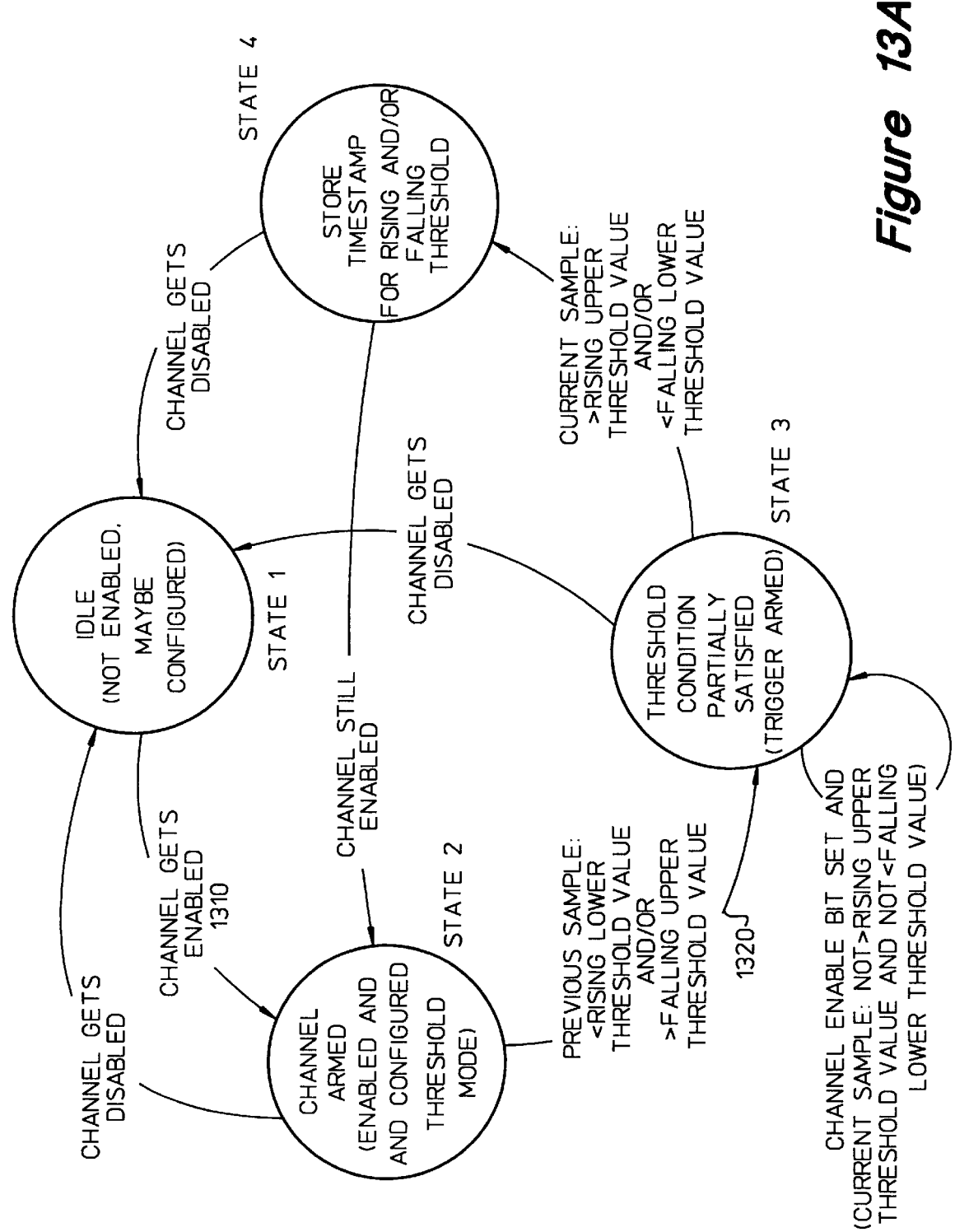
FIG. 13A shows a state diagram for the task of performing a threshold operation in an instrumentation controller subsystem according to the present invention.

FIG. 13A shows a state diagram for the task of performing a threshold operation in an instrumentation controller subsystem according to the present invention where the input channel is configured for the Threshold Timestamping Mode. In this input mode, the instrumentation controller 220 samples data on the channel at a user-specified pace, and for each sample checks to determine if a condition has been encountered. The condition can be the incoming signal crossing a specific threshold when it is rising, falling, or both. Additionally, it is possible to have user-specified noise levels rejected from consideration when checking the signal. This can also be described as allowing the user to specify a hysteresis tolerance without affecting the desired data. When the condition is met, the instrumentation controller saves and delivers a timestamp indicating the time of occurrence to the host processor 236 (and application software).

Referring to FIG. 13A, the channel is idle when it is not enabled. In state 1, the channel must be configured by the application prior to being enabled. This configuration process includes the step of setting up the respective registers for the channel to meet its functional requirements. The following are examples of register functions which may be configured: mode (e.g., threshold crossing in this case, rising, falling, or both), the desired sampling rate, the duration of the test desired, the host memory location for the instrumentation controller 220 to store the results, the method of notifying the host processor 236, the settings of relays and switches which specify the connector being used, the AC/DC coupling, etc. Once the configuration is complete and the channel set up for the expected operations, the host processor 236 enables the channel's operation. At that time, the host processor 236 can proceed to other tasks, and the instrumentation controller 236 will complete the functions.

After being enabled (step 1320), the channel is considered armed (state 2). In state 2, (in the Threshold mode) the instrumentation controller 220 will actively control the analog section 229 and retrieve samples from the ADC at the specified rate. For each sample it performs a number of operations to determine the usability of the sample. For the purposes of this discussion, assume rising threshold mode with noise rejection is specified. First the instrumentation controller 220 compares the current sample to determine if the signal is rising or falling. If the current sample is greater than the previous one the signal is rising. In order to digitally reject any noise that may be present on the signal, and to avoid generating false results because of the noise, the instrumentation controller 220 performs further compare operations. Once it is determined that a signal is rising, the controller compares the current sample with the rising threshold lower hystersis (or rising lower threshold) register, which was initialized by the application. If the signal is less than the rising lower threshold, the transition condition (1320) is satisfied and the threshold condition is partially satisfied (state 3). When the next sample is acquired, it is compared with the contents of the rising threshold upper hystersis (or rising upper threshold) register, which was also initializes by the application as part of the channel configuration. If the sample is greater than the rising upper threshold, the rising threshold condition is considered fully satisfied. Therefore the difference between the rising lower threshold and the rising upper threshold is the noise margin the user can set. After the condition is satisfied, the Controller stores the time that the condition was satisfied (state 4) in the channel's respective data storage unit. At this point, if the channel is still enabled, the channel returns to the armed state (state 2). At any point, if the channel gets disabled by the application, its state returns to the idle state.

If the channel gets configured to search for specific falling threshold conditions, the operation would be analogous, but directions reversed. The instrumentation controller 220 is also capable of searching for both falling and rising thresholds on each and every sample on every channel.

Figure 13B:
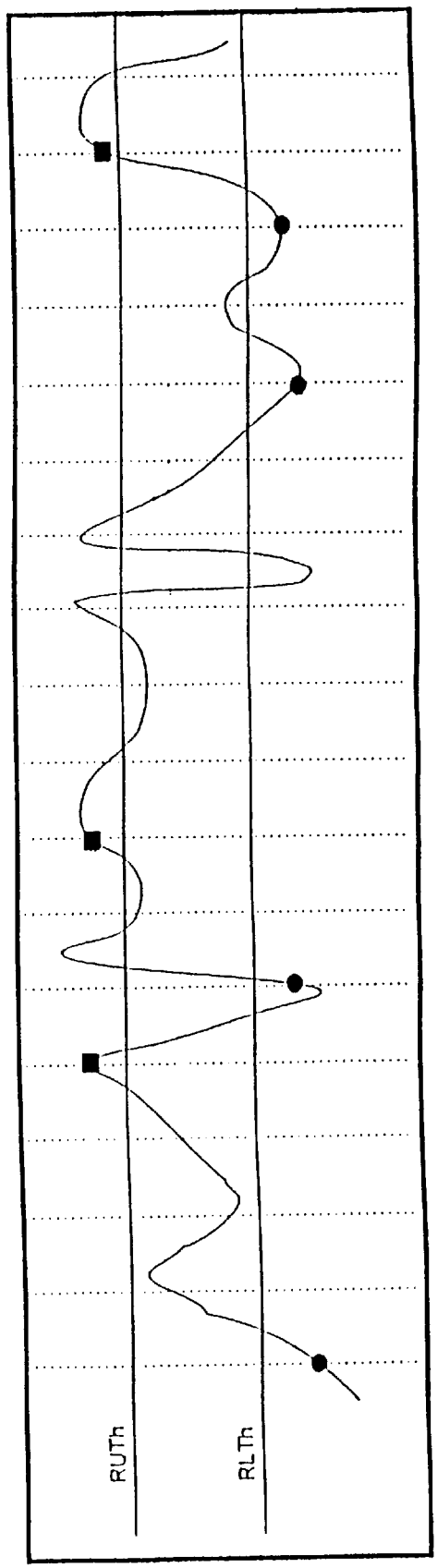
FIG. 13B shows a graphical representation of sampled data points corresponding to performance of a threshold operation in an instrumentation controller subsystem according to the present invention.

FIG. 13B shows a graphical representation of sampled data points corresponding to performance of a threshold operation in an instrumentation controller subsystem according to the present invention. The example shown is for a rising trigger condition although a falling trigger condition would be analogous. The vertical lines represent sampling points. The circles represent the time the threshold trigger is armed. The squares represent the time the trigger is complete and the timestamp is stored.

Figure 14A:
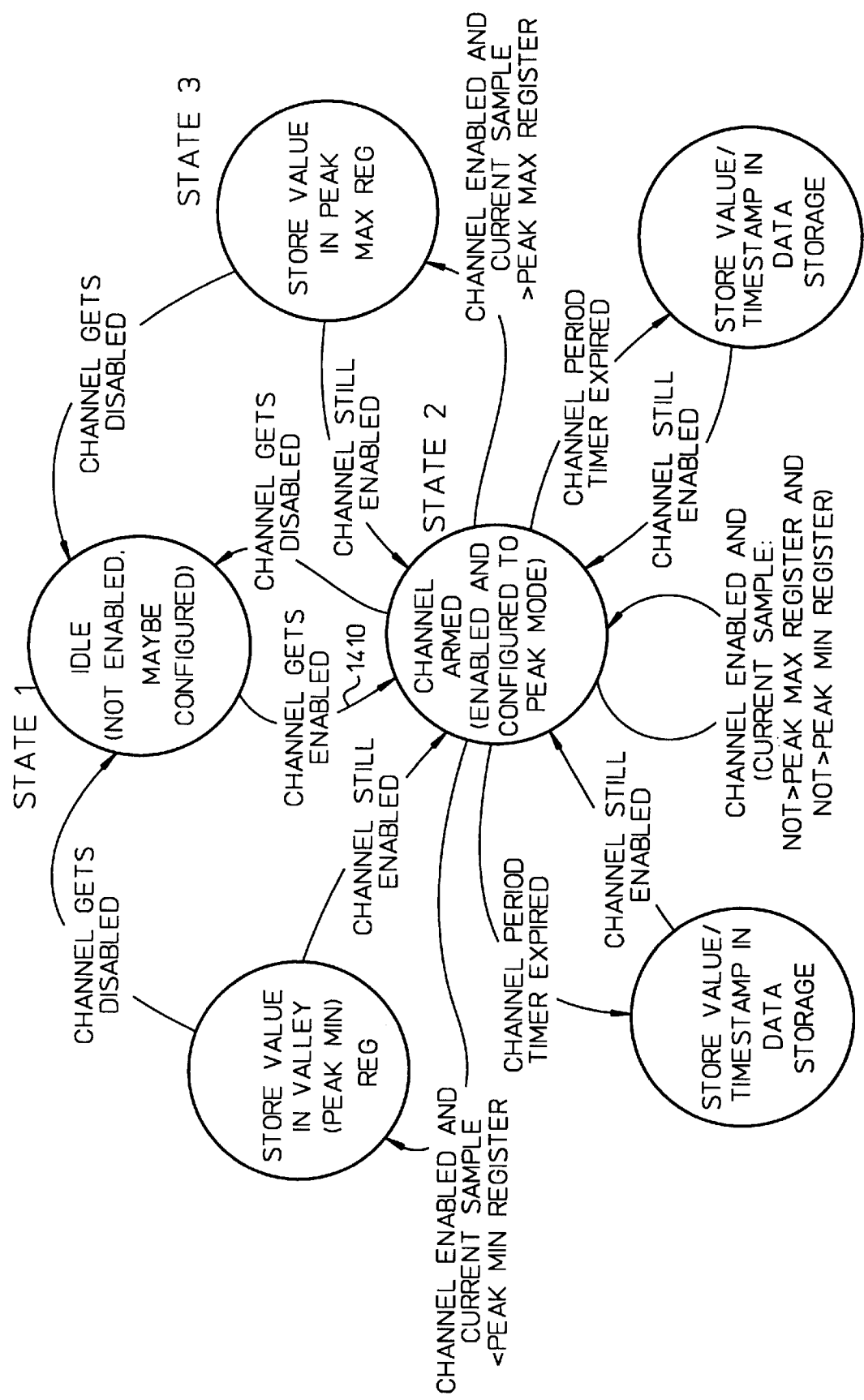
FIG. 14A shows a state diagram for the task of performing a peak detection operation in an instrumentation controller subsystem according to the present invention.
Figure 18:
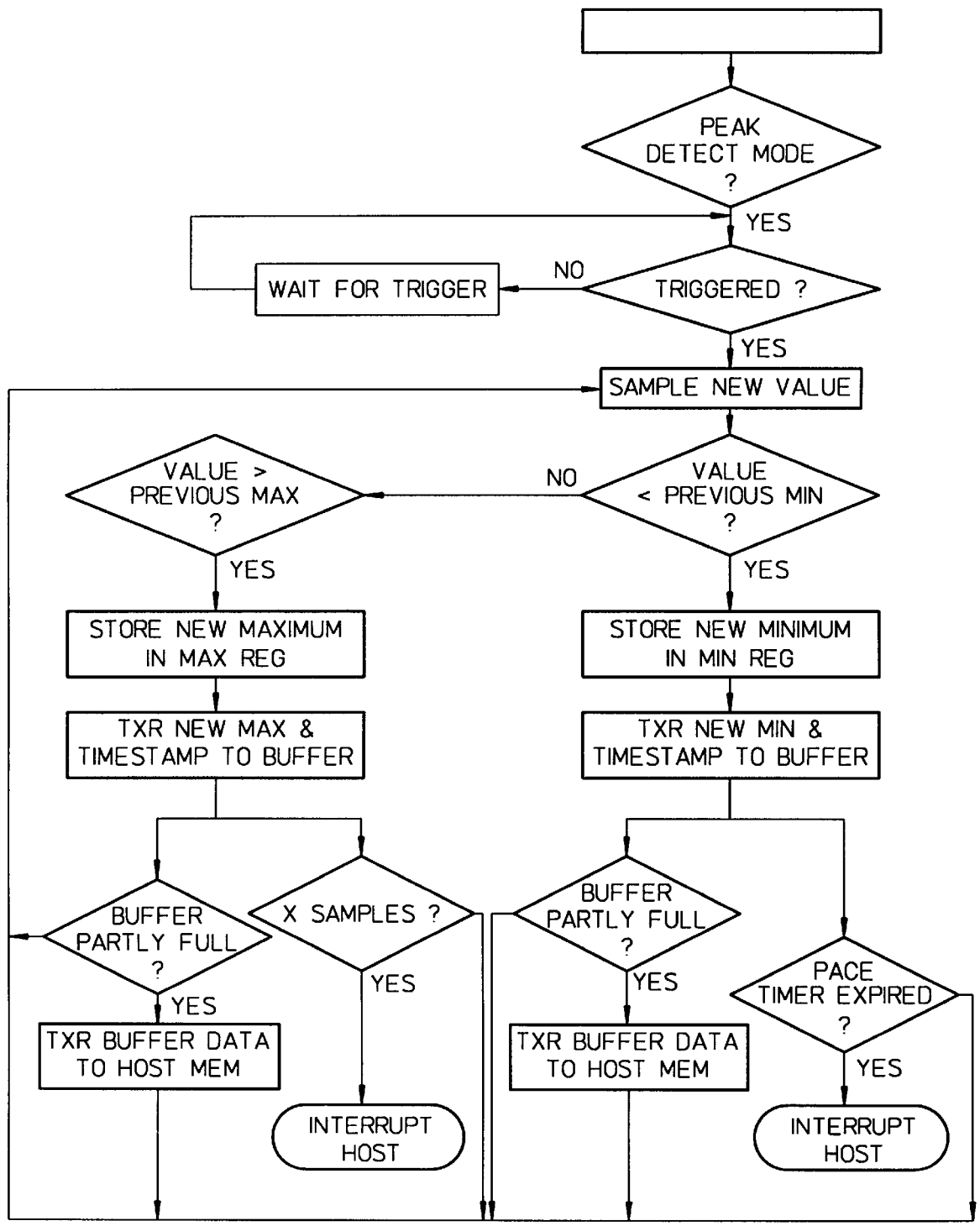
FIG. 18 shows a flow chart of the steps involved in a peak detection operation according to the present invention.

FIG. 14A shows a state diagram for the task of performing a peak detection operation in an instrumentation controller subsystem where an input channel is configured for the Peak Detection Mode. FIG. 18 shows a flow chart of the steps involved in a partial implementation of the peak detection operation shown in FIG. 14A. In the Peak Detection Mode, the instrumentation controller 220 samples data on the channel at a user-specified pace, and checks for peaks and valleys that are encountered on the signal. For each peak or valley result value, the instrumentation controller 220 saves the value of the peak or valley, along with a timestamp that indicates the time of occurrence. In the Peak Detection Mode, it is possible to check for the peak or the valley value over a user-specified amount of time.

Referring to FIG. 14A, the channel is idle when it is not enabled. The channel must be configured by the application prior to being enabled. This configuration process includes setting up the respective registers for each channel to meet its functional requirements. The following are examples of register functions which may be configured: the mode (peak detection in this case, which may include looking for peaks, valleys, or both), the desired sampling rate, the duration of the test desired, the host memory location 236 for the instrumentation controller 220 to store the results, the method of notifying the host processor 236, the settings of relays and switches which specify the connector being used, the AC/DC coupling, etc. Once the configuration is complete and the channel is set up for the expected operations, the host processor enables the channel's operation (step 1410). At that time the host processor 236 can proceed to other tasks, and the instrumentation controller 220 will complete the functions.

After being enabled, the channel is considered armed (state 2). In state 2, the instrumentation controller 220 will actively control the analog section 229 and retrieve samples from the ADC at the specified rate. For each sample, it performs a number of operations to determine the usability of the sample. (For this discussion assume the application is interested in looking for peaks that occur on the signal). In order to detect the peak, the instrumentation controller 220 keeps a running reference point that is continuously updated. The first sample that is obtained by the instrumentation controller 220 is used as the starting reference point against which the following points are gauged. (It is also possible to have the application specify the starting reference point during the channel configuration).

When the next sample is obtained by the instrumentation controller 220, it compares the new sample against the peak reference point. If the new value is greater than the reference point, the new value becomes the new peak reference point (state 3). The instrumentation controller 220 also keeps track of the time the current peak value was detected. The process continues for subsequent samples, where the peak value is continually updated based on the incoming values.

During the channel configuration process, the application is able program the instrumentation controller in two different ways dependent on the action the instrumentation controller 220 should take with respect to the peak values. In the first channel configuration, the instrumentation controller 220 tracks the signal and stores a single peak value (along with its respective timestamp) that is constantly updated. In the first channel configuration, the application can start the process; and at a later time, the application can come back to the instrumentation controller 220 to determine what the peak value was during the time frame the channel was enabled. In the second channel configuration, the application can further automate the process by specifying time intervals that the instrumentation controller 220 should use as its peak reporting periods. In this case, the instrumentation controller 220 will return a peak value for every one of those time periods. It does so by placing the peak values and the respective time of occurrence in an application-specified memory location. In addition, it is also possible to look for valleys (min) or both peaks (max) and valleys during the desired time frame. If the valleys are also looked for, the operation is similar to that described, except the valley reference points are also kept and updated. At any time, if the channel gets disabled by the application, its returns to the idle state (state 1).

Figure 14B:
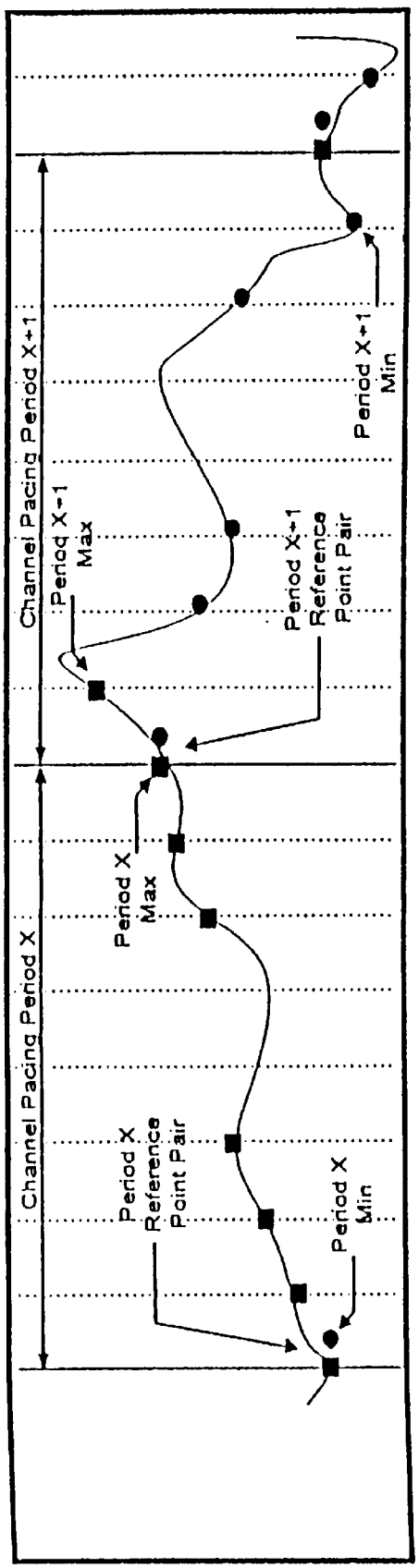
FIG. 14B shows a graphical representation of sampled data points corresponding to performance of a peak detection operation in an instrumentation controller subsystem according to the present invention.

FIG. 14B shows a graphical representation of sampled data points corresponding to performance of a peak detection operation in an instrumentation controller subsystem according to the present invention. Referring to FIG. 14B, the vertical lines represent sampling points; the circles represent when the minimum sample value and corresponding timestamp are stored; and the squares represent when the maximum sample value and the corresponding timestamp are stored.

Figure 15:
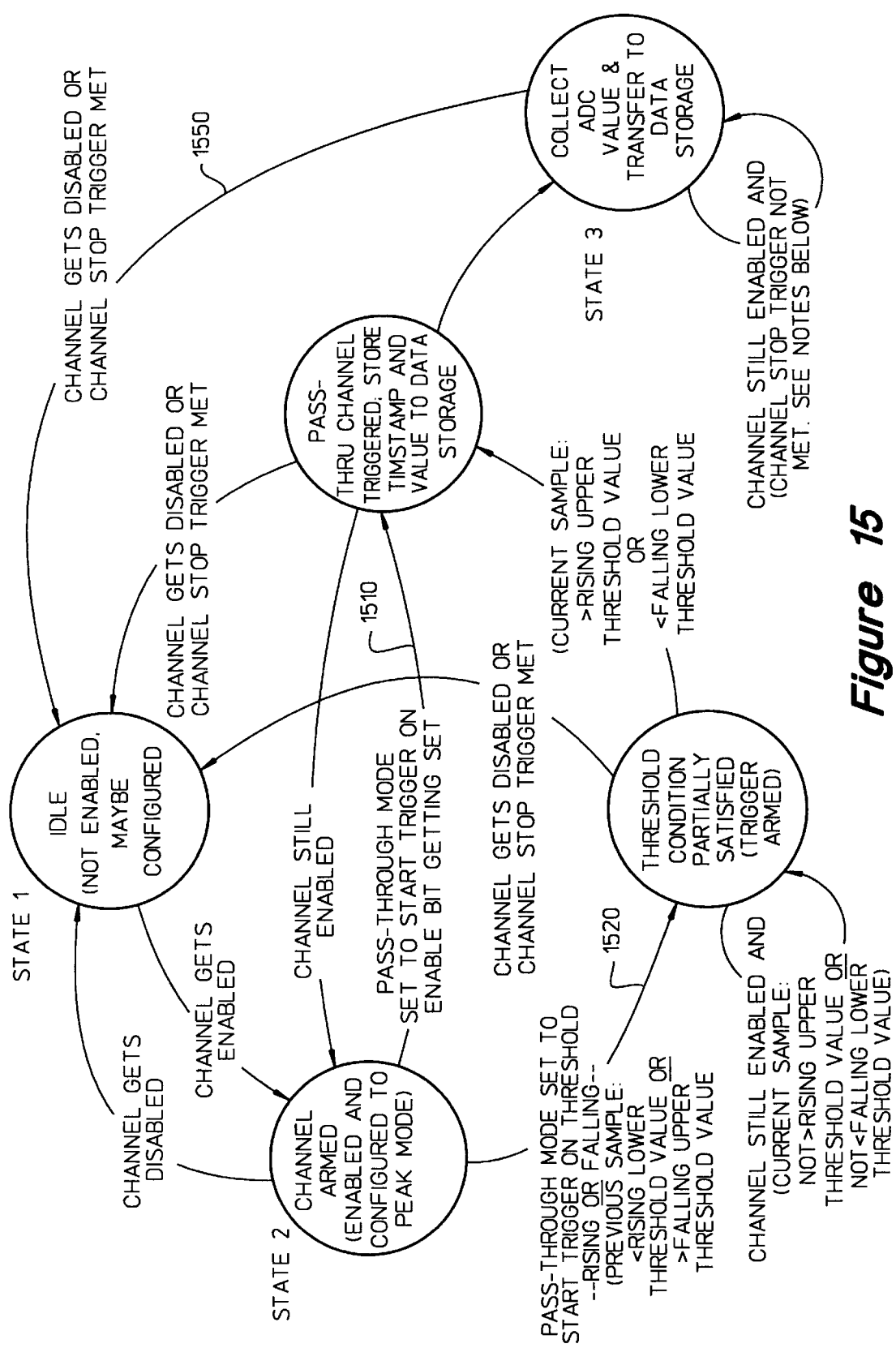
FIG. 15 shows a state diagram for the task of performing a pass through operation for an input channel in an instrumentation controller subsystem according to the present invention.
Figure 19:
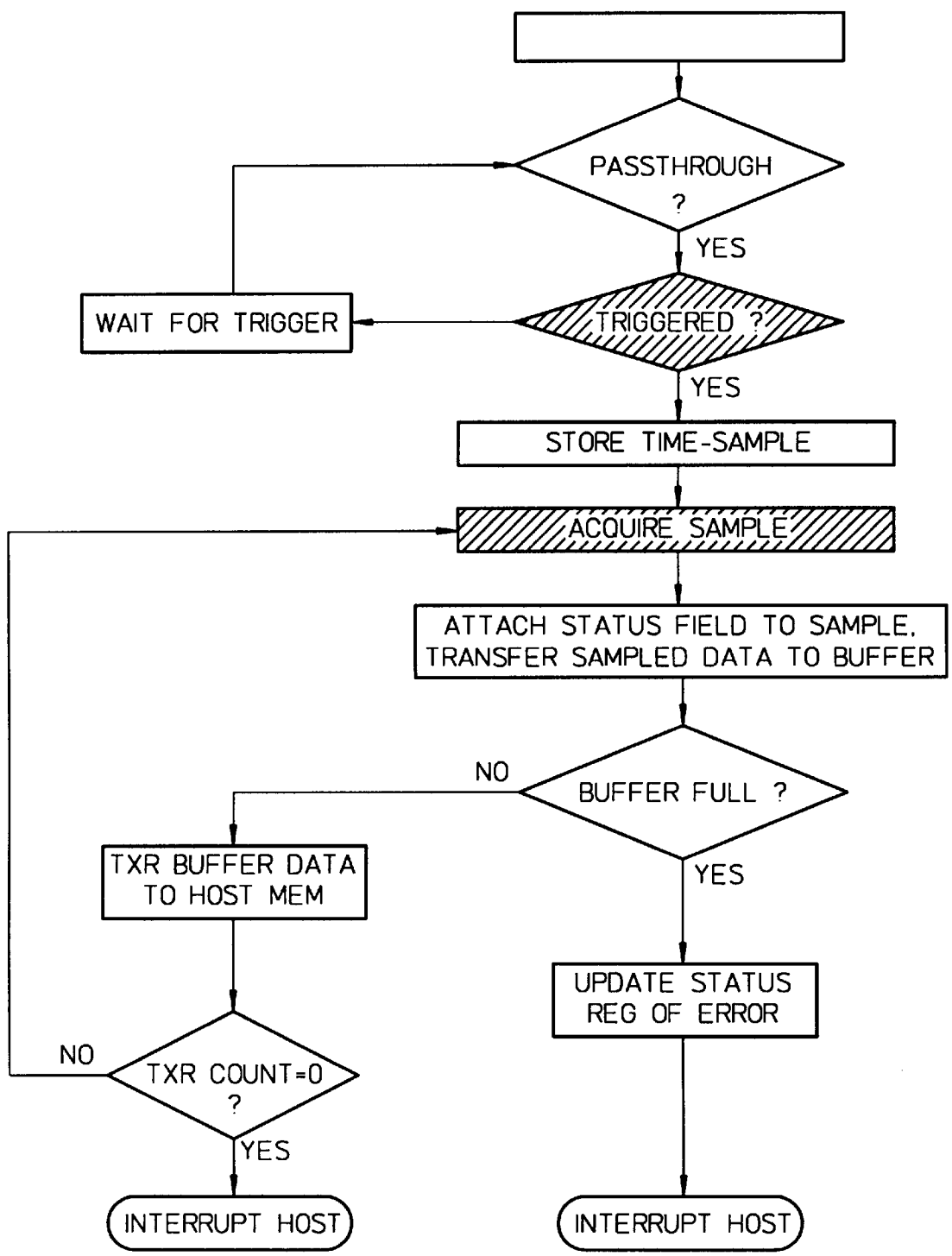
FIG. 19 shows a flow chart of the steps involved in a pass-through operation according to the present invention.

FIG. 15 shows a state diagram for the task of performing a pass through operation for an input channel in an instrumentation controller subsystem where the input channel is configured for the Pass-Through Mode. FIG. 19 shows a flow chart of the steps involved in a partial implementation of the peak detection operation shown in FIG. 14A. In the Pass-Through mode, the instrumentation controller 220 collects samples on the channel at a user-specified rate, and transfers the samples to the host (or other) memory. It attaches a timestamp to first value collected indicating the time the first value was collected. It is possible to specify threshold conditions for starting and stopping the operations. It is also possible to specify the amount (or time-duration) of the data desired. Once the operations is stopped via a stop trigger event, it is possible to interrupt the host processor 236 to inform it that the data is in its memory. In addition, it is also possible to specify routine interrupt sequences to allow the host processor to use the data as it is being collected and sent to memory.

Referring to FIG. 15, the channel is idle when it is not enabled (state 1). The channel must be configured by the application prior to being enabled. This configuration process includes setting up the respective registers for each channel to meet its functional requirements. The following are examples of register functions which may be configured: mode (pass-through mode in this case), the desired sampling rate, the duration of the test desired, the host memory location for the instrumentation controller to store the results, the method of notifying the host, the settings of relays and switches which specify the connector being used, the AC/DC coupling, etc. Once the configuration is complete and the channel is set for the expected operations, the host processor 236 enables the channel's operation. At that time the host processor can proceed to other tasks, and the instrumentation controller 220 will complete the functions.

After being enabled, the channel is considered armed (state 2). The objective of the Pass-through mode is to have the instrumentation controller 220 obtain sample values and transfer them to the host memory 236. The Pass-through mode supports two different start options. In Pass-through mode, once the channel is enabled, it can either start acquiring data (step 1510) (the mode's store trigger is equal to the channel getting enabled), or it can look for a specific slope and/or level on the signal (step 1520) before starting to save the data it is acquiring (step 1530). This latter trigger mode is analogous to the threshold mode's operation, except that when the threshold condition is detected, the instrumentation controller 220 is triggered to save all of the data it is sampling 1540. Either way, the first sample that is saved will have a timestamp associated with it to indicate the begin time. Once the storage trigger is met, the instrumentation controller 220 will save the data (state 3) until either the channel is disabled, or optionally after a specified number of samples have been acquired, or optionally upon encountering a threshold condition that acts as the channel's disable trigger (step 1550).

The Pass-through mode is useful when the application desires all of the data be saved to a file for later use or displayed on the screen as in a digital oscilloscope. In Pass-through mode data can be collected continuously in an uninterrupted fashion (within the constraints of the system memory and hard disk capacity); a feature that standard oscilloscopes do not support. It is also possible to use the stored data to generate the same signal on an output channel. This is especially useful when the user tries to re-create certain conditions on a unit under test after having had a chance to analyze them.

Figure 16:
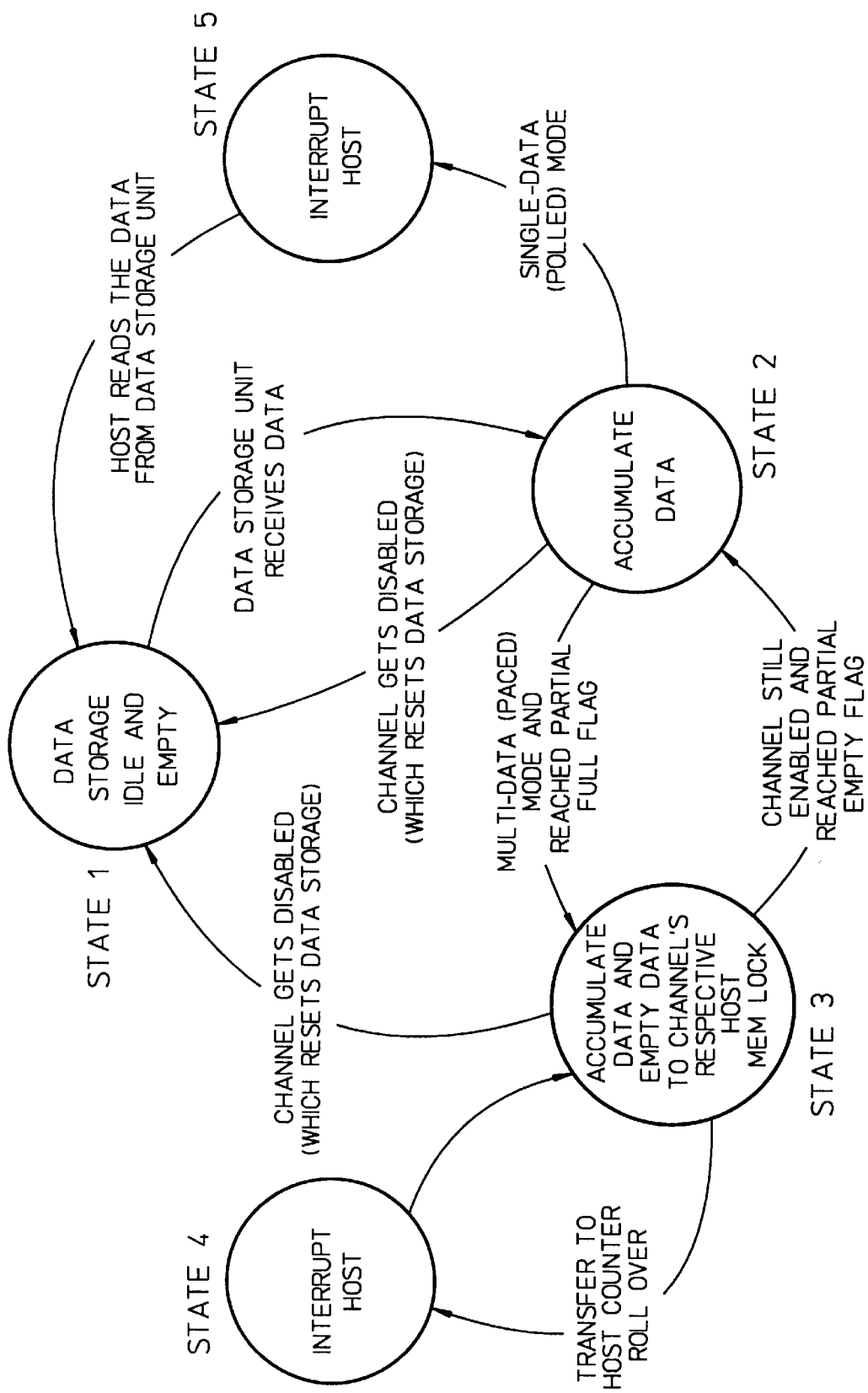
FIG. 16 shows a state diagram for the task of performing a data storage operation for an input channel in an instrumentation controller subsystem according to the present invention.

FIG. 16 illustrates the operation of an example data storage unit (FIFO type) on an input channel. In state 1, the channel is in an IDLE state and the FIFO is reset to empty. Once the data qualification unit 226 enables the FIFO, it can send data to it. After receiving data, the FIFO can continue accumulating data (state 2). User-programmable FIFO flags (e.g. partially full flag) can determine when the FIFO can start the process of requesting service from the instrument peripheral interface unit 204 for transfer of the FIFO contents to the host. The "rubber band" process of filling, emptying, or filling/emptying (state 3) continues until the channel is stopped.

The data storage unit must also support single-data transactions. In this case the FIFO would accept one value, and provide it to the instrument peripheral interface unit 204 when the host tries to read the data (state 5). For further flexibility, the host should be able to receive notification (via an interrupt, or mail box status update) in the case of user-specified conditions, such as completion of transfer of a certain quantity of data (state 4). With the hardware versus software partitioning of the test diagnostic system architecture, it is possible to perform a prestore of the data (storing data before a channel start trigger condition occurs) either directly in the instrumentation controller 220 or at the driver/application level. The size of the data storage unit inside the instrumentation controller 220 versus the desired prestore size will affect that decision.

Figure 17:
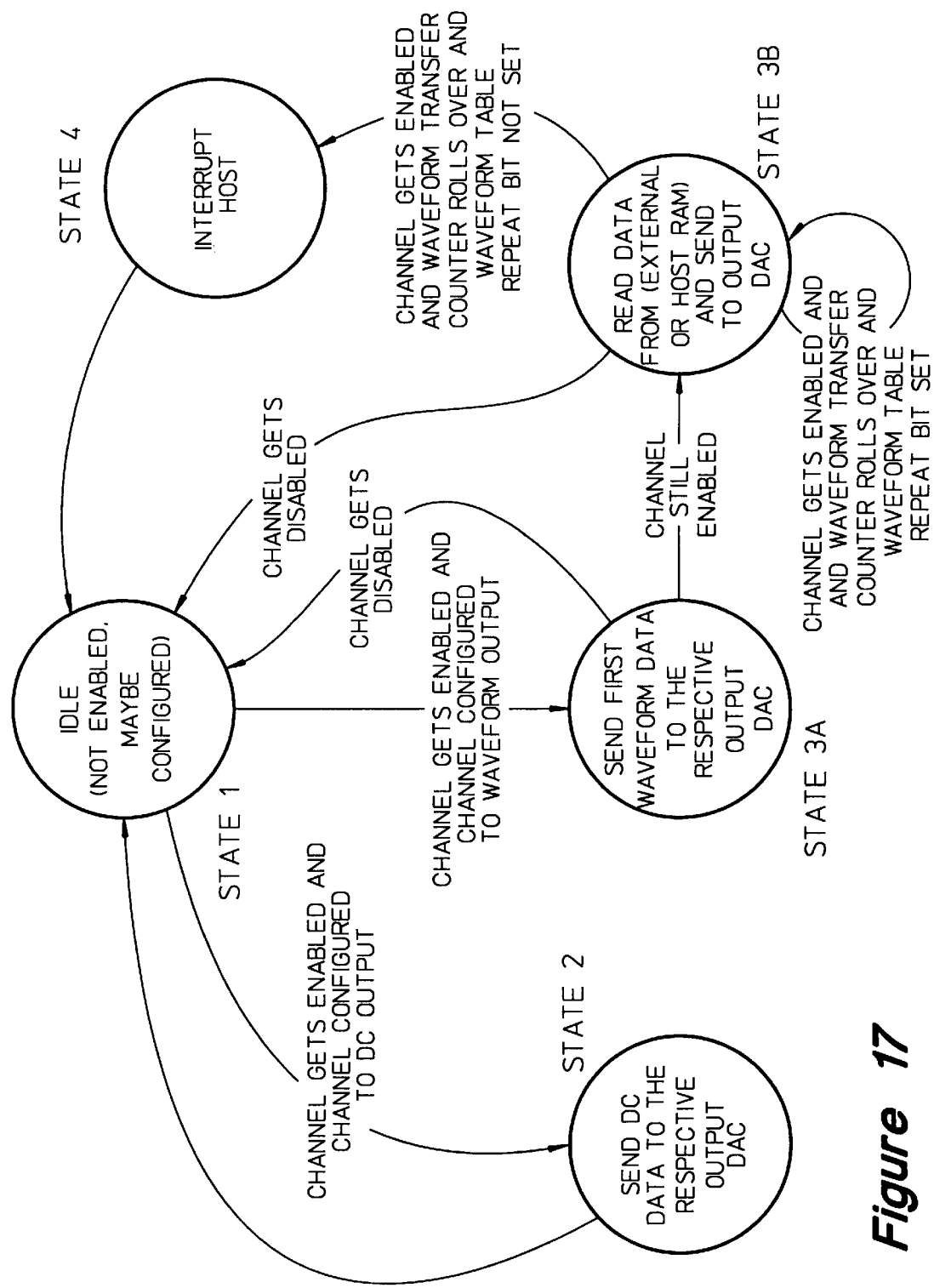
FIG. 17 shows a state diagram for the task of performing an operation for an output channel in an instrumentation controller subsystem according to the present invention.

FIG. 17 shows a state diagram for the task of performing an operation for an output channel in an instrumentation controller 220 according to the present invention. The output capabilities of the instrumentation controller 220 include driving data to the analog circuitry 229 and controlling the analog output circuity. The analog output circuitry 229 can support voltage or current outputs, including ohms-related current output. It is also possible to configure the instrumentation controller 220 for either DC outputs (where single values are sent to respective DACs) or for generation of waveform outputs (where series of values are sent to respective DACs) for the functionality of arbitrary output waveforms. The instrumentation controller 220 accomplishes the latter task by retrieving the data values from a pre-generated table that could reside either in the host memory 236 or in local storage.

Figure 20:
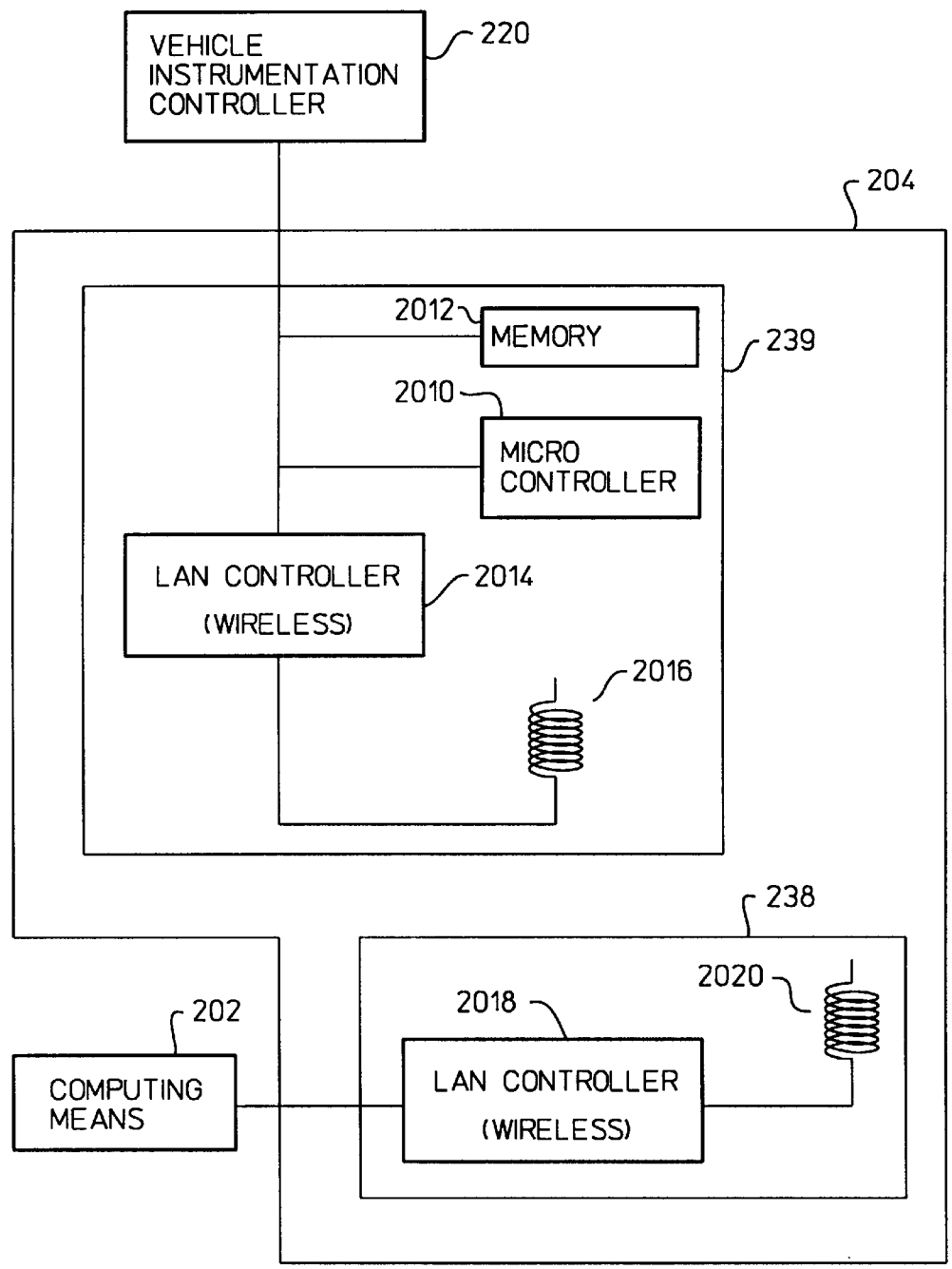
FIG. 20 shows a block diagram of a test diagnostic system according to an alternative embodiment of the present invention where communication between the instrumentation controller and the computing means is via a wireless LAN.

The output channel is initially in an idle state with no output activity is occurring (state 1). The application (via the device driver) first initializes and configures the output channel (for things such as connector usage, ohms or direct output, DC or waveform output, waveform table location, etc.) For single outputs to DACs as in the case of the DC functions, the value is sent to the desired DAC (state 2). When the waveform mode is chosen, the controller retrieves the data from the waveform table and sends it to the desired DAC (states 3A and 3B). The presence or depth of the data storage device 224 on the output channel is mainly related to the rate of the output to the DAC in the waveform mode. It is possible to specify to traverse through the whole table or through part of the table. It is also possible to traverse through the waveform table once, or repeatedly. If the waveform table is traversed repeatedly, the operation can repeat indefinitely, or until a certain number or loops have completed. The host processor 232 can be notified in a different ways upon the completion of the task (state 4). At any time that the channel is disabled, the output logic defaults to the idle state (state 1 ). FIG. 20 shows a block diagram of a test diagnostic system according to an alternative embodiment of the present invention where communication between the instrumentation controller and the computing means is via a wireless LAN.

The instrument peripheral interface 204 can be a bus interface or a network interface. If the instrument peripheral interface 204 is a network interface it can be either wire or wireless. FIG. 20 shows a block diagram of a test diagnostic system according to an alternative embodiment of the present invention where communication between the instrumentation controller 220 and the computing means 202 is via a wireless LAN. In the embodiment shown in FIG. 20, the instrument peripheral interface 204 is comprised of a microcontroller 2010, a LAN memory means 2012, a first LAN controller 2014, a first means for wireless communication 2016, a second LAN controller 2018 and a second means for wireless communication 2020.

The instrument peripheral interface includes a first data interface means 238 comprised of a second LAN controller 2018 and a second means for wireless communication 2020 and a second data interface means 239 comprised of a microcontroller 2010, a LAN memory means 2012, a first LAN controller 2014, and a first means for wireless communication 2016. Although the electrical connections may vary, the microcontroller 2010, the LAN memory means 2012, the first LAN controller 2014, and the first means for wireless communication 2016 are electrically coupled. Further, the second LAN controller 2018 is electrically coupled to the second means for wireless communication 2020. The first means for wireless communication 2016 and the second means for wireless communication 2020 are in wireless communication for the transfer of data between the first data interface means 238 and the second data interface means.

Figure 21:
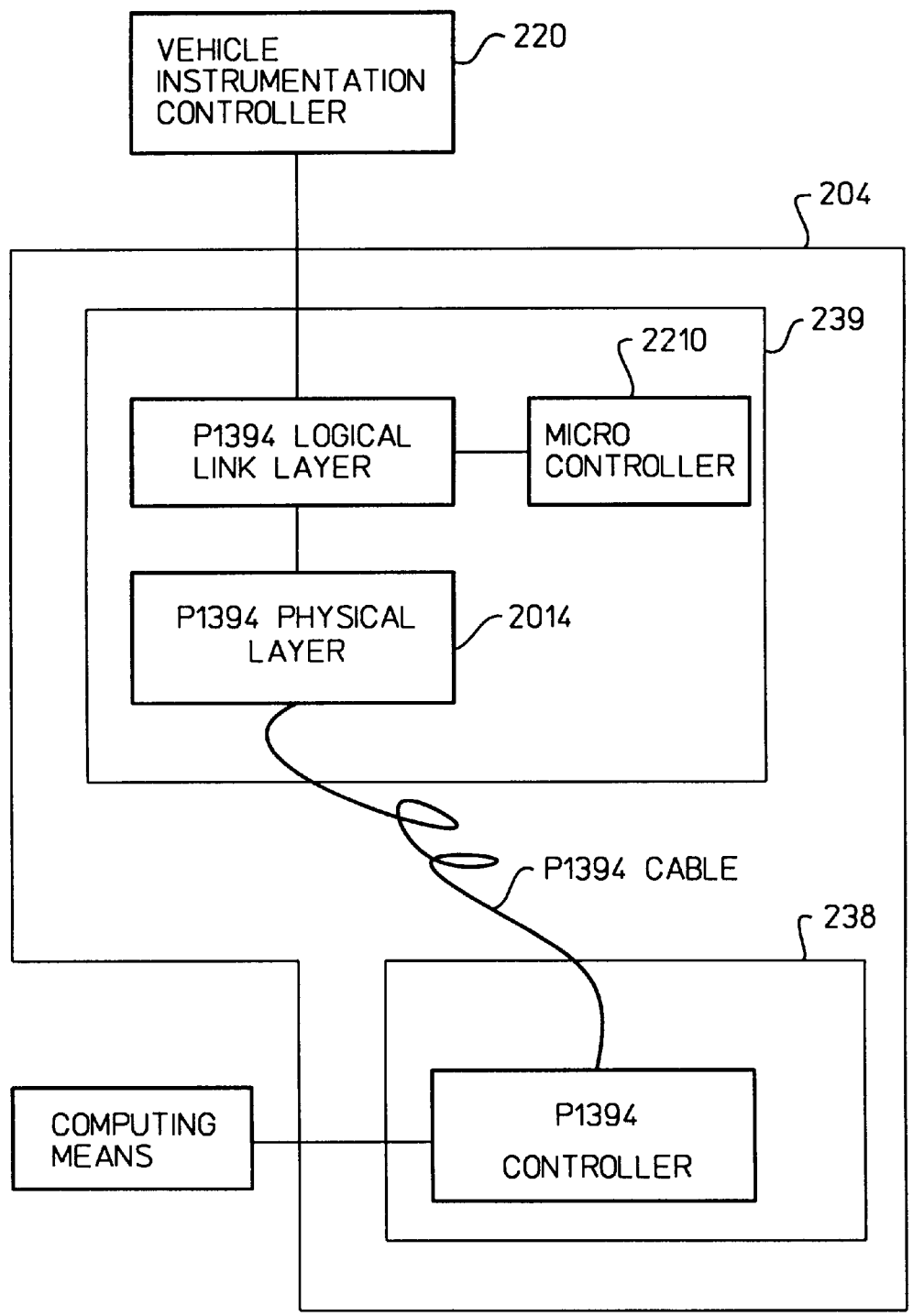
FIG. 21 shows a block diagram of a test diagnostic system according to an alternative embodiment of the present invention.

FIG. 21 shows a block diagram of a test diagnostic system according to an alternative embodiment of the present invention. The embodiment shown in FIG. 21 is similar to the embodiment shown in FIG. 2, however, the embodiment shown in FIG. 2 further includes a microcontroller 2120. In the embodiment shown in FIG. 21, the first data interface means includes a microcontroller 2120 electrically coupled to the link logic controller 246 and the physical interface 248.

Although the modular diagnostic, test and information system in accordance with the present invention is susceptible to being used in various applications, it has been found to be particularly advantageous for use in the maintenance diagnostics and repair of motor vehicles. Therefore, an embodiment of the test system is described in accordance with the service of a motor vehicle. However, it is understood that this invention may also be applicable to non-motor vehicle applications.

It is understood that the above description is intended to be illustrative and not restrictive. For example, it is possible to have n instrumentation controllers that are in communication with m computing means, where n and m are integer values greater than or equal to 1. The scope of the invention should be determined with reference to the appended claims, along with the full scope of equivalents to which such claims are entitled.

What is claimed is:

1. A vehicle diagnostic instrumentation controller for a vehicle diagnostic system, the vehicle diagnostic instrument controller comprising:
    an instrument peripheral interface means;
    an instrumentation control means, the instrumentation control means being further comprised of an arbitration control means and a device interface means, wherein the arbitration control means is electrically coupled to the device interface means;
    a plurality of analog devices electrically coupled to the instrumentation control means, wherein the instrumentation control means and the plurality of analog devices form a plurality of independent channels capable of processing data input from the plurality of analog devices in parallel; and
    a first bus for electrically coupling the instrument peripheral interface means to the instrumentation control means.

2. The vehicle diagnostic instrumentation controller recited in claim 1 wherein the instrumentation control means further includes a data storage means, wherein the data storage means is electrically coupled to the arbitration control means and the arbitration control means is further electrically coupled to the instrumentation peripheral interface means.

3. The vehicle diagnostic instrumentation controller recited in claim 1 further including a data qualification means, wherein the data qualification means is electrically coupled to the device interface means.

4. The vehicle diagnostic instrumentation controller recited in claim 3 wherein the instrumentation control means further includes a data storage means, wherein the data storage means is electrically coupled to the arbitration control means and the data qualification means.

5. The vehicle diagnostic instrumentation controller recited in claim 3 wherein the instrument peripheral interface means is capable of performing bus mastership.

6. The vehicle diagnostic instrumentation controller recited in claim 1 wherein the instrument peripheral interface means is further comprised of a first data interface means, a second data interface means, and a second bus for electrically coupling the first data interface means to the second data interface means.

7. The vehicle diagnostic instrumentation controller recited in claim 6 wherein the second bus is an IEEE 1394 cable.

8. The vehicle diagnostic instrumentation controller recited in claim 6 wherein the second bus is a PCI cable.

9. The vehicle diagnostic instrumentation controller recited in claim 6 wherein the second bus is a LAN connector cable.

10. The vehicle diagnostic instrumentation controller recited in claim 6 further including a microcontroller electrically coupled to the first bus.

11. The vehicle diagnostic instrumentation controller recited in claim 6 wherein the peripheral instrumentation interface means is a wireless interface.

12. The vehicle diagnostic instrumentation controller recited in claim 1 wherein the instrumentation controller is implemented in a re-programmable logic device.

13. A vehicle diagnostic test system comprising:
    a computing means;
    an instrument peripheral interface means;
    a third bus for electrically coupling the computing means to the instrument peripheral interface means;
    an instrumentation control means, the instrumentation control means being further comprised of an arbitration control means and a device interface means, wherein the arbitration control means is electrically coupled to the device interface means;
    a plurality of analog devices electrically coupled to the instrumentation control means, wherein the instrumentation control means and the plurality of analog devices form a plurality of independent channels capable of processing data input from the plurality of analog devices in parallel; and
    a first bus means for electrically coupling the instrument peripheral interface means to the instrumentation control means.

14. The vehicle diagnostic test system recited in claim 13 wherein the computing means is further comprised of host processor and a host memory, an applications program being stored in the host memory.

15. The vehicle diagnostic test system recited in claim 14 wherein the application program run on the computing means directs the instrumentation control means to perform a series of tasks, wherein all of the real time tasks are performed in the instrumentation control means.

16. The vehicle diagnostic test system recited in claim 14 wherein data transferred between a first channel and the host memory is independent of data transferred between a second channel and the host memory.

17. The vehicle diagnostic test system recited in claim 14 wherein an application program run on the computing means directs the instrumentation control means to perform a series of tasks, wherein the tasks performed on a first channel and a second channel are pipelined.

18. The vehicle diagnostic test system recited in claim 14 wherein the instrumentation control means performs the task of performing rejection of user-specified noise levels via upper and lower hysteresis values on a first channel.

19. The vehicle diagnostic test system recited in claim 14 wherein the instrumentation control means performs the task of peak and valley detection of incoming data signals from the device interface means transferred on the at least one channel.

20. The vehicle diagnostic test system recited in claim 15 wherein a first frequency is supported on a first channel and a second channel is supported on a second channel.

* * * * *